United States Patent [19]
Payne et al.

[11] Patent Number: 5,715,314
[45] Date of Patent: Feb. 3, 1998

[54] NETWORK SALES SYSTEM

[75] Inventors: Andrew C. Payne, Lincoln; Lawrence C. Stewart, Burlington; David J. Mackie, Cambridge, all of Mass.

[73] Assignee: Open Market, Inc., Cambridge, Mass.

[21] Appl. No.: 328,133

[22] Filed: Oct. 24, 1994

[51] Int. Cl.⁶ .................................................. H04L 9/00
[52] U.S. Cl. .......................... 380/24; 380/23; 380/25; 380/49; 380/50
[58] Field of Search ............................ 380/4, 21, 23, 380/24, 25, 49, 50; 364/401, 406, 408, 284.4; 235/379, 380; 395/200.01, 200.02, 200.09, 925

[56] References Cited

U.S. PATENT DOCUMENTS

| | | | |
|---|---|---|---|
| 4,305,059 | 12/1981 | Benton | 340/825.33 |
| 4,578,530 | 3/1986 | Zeidler | . |
| 4,734,858 | 3/1988 | Schlafly | 364/408 |
| 4,755,940 | 7/1988 | Brachtl et al. | 364/408 |
| 4,775,935 | 10/1988 | Yourick | 364/401 |
| 4,795,890 | 1/1989 | Goldman | 235/380 |
| 4,799,156 | 1/1989 | Shavit et al. | 364/401 |
| 4,812,628 | 3/1989 | Boston et al. | 235/380 |
| 4,827,508 | 5/1989 | Shear | 380/4 |
| 4,922,521 | 5/1990 | Krikke et al. | 379/95 |
| 4,935,870 | 6/1990 | Burk, Jr. et al. | . |
| 4,947,028 | 8/1990 | Gorog | 235/381 |
| 4,977,595 | 12/1990 | Ohta et al. | 380/24 |
| 4,982,346 | 1/1991 | Girouard et al. | 364/550 |
| 4,992,940 | 2/1991 | Dworkin | 364/401 |
| 5,025,373 | 6/1991 | Keyser, Jr. et al. | 364/408 |
| 5,060,153 | 10/1991 | Nakagawa | 364/405 |
| 5,077,607 | 12/1991 | Johnson et al. | . |

(List continued on next page.)

FOREIGN PATENT DOCUMENTS

| | | | |
|---|---|---|---|
| 0-542-298-A2 | 5/1993 | European Pat. Off. | G07F 7/10 |
| 2102606 | 2/1983 | United Kingdom | G07F 7/10 |
| WO 91/16691 | 10/1991 | WIPO | G07F 7/10 |
| WO 95/16971 | 6/1995 | WIPO | . |

OTHER PUBLICATIONS

Rivest, R.L. et al., "A Method for Obtaining Digital Signatures and Public-Key Cryptosystems," Laboratory for Computer Science, Massachusetts Institute of Technology, Cambridge, Massachusetts, no date.

Bellcore Internal E-Mail, Nov. 24, 1993.

Sirbu, Marvin A.; "Internet Billing Service Design and Prototype Implementation"; *An Internet Billing Server*, pp. 1–19, no date.

*Payment Systems*, "United States"; pp. 115–135, no date.

National Westminster Bank Group Brochure; pp. 1–29, no date.

(List continued on next page.)

*Primary Examiner*—Bernarr E. Gregory
*Attorney, Agent, or Firm*—Fish & Richardson P.C.

[57] ABSTRACT

A network-based sales system includes at least one buyer computer for operation by a user desiring to buy a product, at least one merchant computer, and at least one payment computer. The buyer computer, the merchant computer, and the payment computer are interconnected by a computer network. The buyer computer is programmed to receive a user request for purchasing a product, and to cause a payment message to be sent to the payment computer that comprises a product identifier identifying the product. The payment computer is programmed to receive the payment message, to cause an access message to be created that comprises the product identifier and an access message authenticator based on a cryptographic key, and to cause the access message to be sent to the merchant computer. The merchant computer is programmed to receive the access message, to verify the access message authenticator to ensure that the access message authenticator was created using the cryptographic key, and to cause the product to be sent to the user desiring to buy the product.

48 Claims, 25 Drawing Sheets

Microfiche Appendix Included
(1 Microfiche, 34 Pages)

U.S. PATENT DOCUMENTS

| | | | |
|---|---|---|---|
| 5,220,501 | 6/1993 | Lawlor et al. | 364/408 |
| 5,247,575 | 9/1993 | Sprague et al. | 380/9 |
| 5,305,195 | 4/1994 | Murphy | 364/401 |
| 5,336,870 | 8/1994 | Hughes | 235/379 |
| 5,341,429 | 8/1994 | Stringer et al. | 380/23 |
| 5,347,632 | 9/1994 | Filepp et al. | 395/200.09 |
| 5,351,186 | 9/1994 | Bullock et al. | 364/401 |
| 5,351,293 | 9/1994 | Michener et al. | 380/21 |
| 5,383,113 | 1/1995 | Kight et al. | 364/401 |
| 5,414,833 | 5/1995 | Hershey et al. | 395/575 |

OTHER PUBLICATIONS

Even et al.; "Electronic Wallet"; pp. 383–386; 1983.

Okamoto et al.; "Universal Electronic Cash"; pp. 324–337; 1991.

Pfitzmann et al.; "How to Break and Repair a 'Provably Secure' Untraceable Payment System"; pp. 338–350; 1991.

Intuit Corp Quicken User's Guide; "Paying Bills Electronically"; pp. 171–192, no date.

Compuserve International; Compuserve Information Service Users Guide; pp. 109–114; 1986.

Gifford, David; "Notes on Community Information Systems" MIT LCS TM–419; Dec., 1989.

Vittal, J. "Active Message Processing: Messages as Messengers"; pp. 175–195; 1981.

Bos et al.; "SmartCash: A Practical Electronic Payment System"; pp. 1–8; Aug. 1990.

American National Standard; "Financial Institution Retail Message Authentication"; ANSI X9.19; 1986.

American National Standard; "Interchange Message Specification for Debit and Credit Card Message Exchange Among Financial Institutions"; ANSI X9.2; 1988.

Chaum et al., "Achieving Electronic Privacy"; *Scientific American*; pp. 319–327; 1988.

Bürk et al.; "Value Exchange Systems Enabling Security and Unobservability"; *Computers & Security*, 9; pp. 715–721; 1990.

Chaum et al.; "Untraceable Electronic Cash"; *Advances in Cryptology*; pp. 319–327; 1988.

Schamüller–Bichl, I.; "IC–Cards in High–Security Applications"; Selected Papers from the Smart Card 2000 Conference; *Springer Verlag*; pp. 177–199; 1991.

Newman, B.C.; "Proxy–Based Authorization and Accounting for Distributed Systems"; Proc. *13th Int. Conf. on Dist. Comp. Sys.*; May, 1993.

Medvinsky et al.; "Electronic Currency for the Internet"; *Electronic Markets*; pp. 30–31, Sep., 1993.

Anderson, Ross J.; "UEPS—A Second Generation Electronic Wallet"; Proc. of the Second European Symposium on Research in Computer Security (ESORICS); Toulouse, France; pp. 411–418, no date.

Anderson, Ross; "Why Cryptosystems Fail"; Proc. 1st Conf. Computer and Comm. Security; pp. 215–227; Nov., 1993.

Dukach, Semyon; "SNPP: A Simple Network Payment Protocol"; MIT Laboratory for Computer Science; Cambridge, Massachusetts; 1993.

Medvinsky et al.; "NetCash: A Design for Practical Electronic Currency on the Internet"; Proc. 1st ACM Conf. on Comp. and Comm. Security; Nov., 1993.

Society for Worldwide Interbank Financial Telecommunications S.C.; "A S.W.I.F.T. Overview", no date.

Case Study: The CIRRUS Banking Network; Comm. ACM 8, 28' pp. 797–8078; Aug., 1985.

Intel Corporation; Power Technology; Marketig Brochure, no date.

Bender, M.; "EFTS: Electronic Funds Transfer Systems"; Kennikat Press; Port Washington, New York; pp. 43–46; 1975.

Abadi, M. et al.; "Authentication and Delegation with Smart–Cards" Report 67; Systems Research Center; Digital Equipment Corporation; Palo Alto, California; Oct. 22, 1990, revised Jul. 30, 1992.

Information Network Institute, Carnegie Mellon University; Internet Billing Server; Prototype Scope Document; Oct. 14, 1993.

Krajewski, M.; "Concept for a Smart Card Kerberos"; 15th National Computer Security Conference; Oct., 1992.

Krajewski, M.; "Smar Card Augmentation of Kerberos"; Privacy and Security Research Group Workshop on Network and Distributed System Security; Feb., 1993.

Krajewski, M. et al.; "Applicability of Smart Cards to Network User Authentication"; *Computing Systems*; vol. 7, No. 1; 1994.

Harty et al.; "Case Study: The VISA Transaction Processing System"; 1988.

International Organization for Standardization; "International Standard: Bank Card Originated Messages—Interchange Message Specifications—Content for Financial Transactions"; ISO 8583; 1987.

Rivest, R.; "The MD5 Message–Digest Algorithm"; MIT Laboratory for Computer Science and RSA Data Security, Inc.; Apr., 1992.

Voydock, Victor et al.; "Security Mechanisms in High–Level Network Protocols"; Computer Surveys; vol. 15, No. 2; Jun., 1981.

Needham, Roger M., "Adding Capability Access to Conventional File Servers"; Xerox Palo Alto Research Center; Palo Alto, California; no date.

Gligor, Virgil D. et al.; "Object Migration and Authentication"; IEEE Transactions on Software Engineering; vol. SE–5, No. 6; Nov., 1979.

Chaum, D.L. et al.; "Implementing Capability–Based Protection Using Encryption"; Electronics Research Laboratory, College of Engineering, University of California, Berkeley, California; Jul. 17, 1978.

Gifford, David K.; "Cryptographic Sealing for Information Secrecy and Authentication"; Stanford University and Xerox Palo Alto Research Center; Communications of the ACM; vol. 25, No. 4; Apr., 1982.

Mosaic Communications Corp. press release; "Mosaic Communications Unveils Network Navigator and Server Software for the Internet"; Sep. 12, 1994.

Rescorla, E. and Schiffman, A.; "The Secure HyperText Transfer Protocol"; Enterprise Integration Technologies; Jun., 1994.

Tenenbaum, Jay M. and Schiffman, Allan M.; "Development of Network Infrastructure and Services for Rapid Acquisition"; adapted from a white paper submitted to DARPA by MCC in collaboration with EIT and ISI.

Cohen, Danny; "Computerized Commerce"; ISI Reprint Series IS/RS–89–243; Oct., 1989; Reprinted from Information Processing 89, Proceedings of the IFIP World Computer Congress, held Aug. 28–Sep. 1 1989.

Cohen, Danny; "Electronic Commerce"; University of Southern California Information Sciences Institute, Research Report ISI/RR–89–244; Oct., 1989.

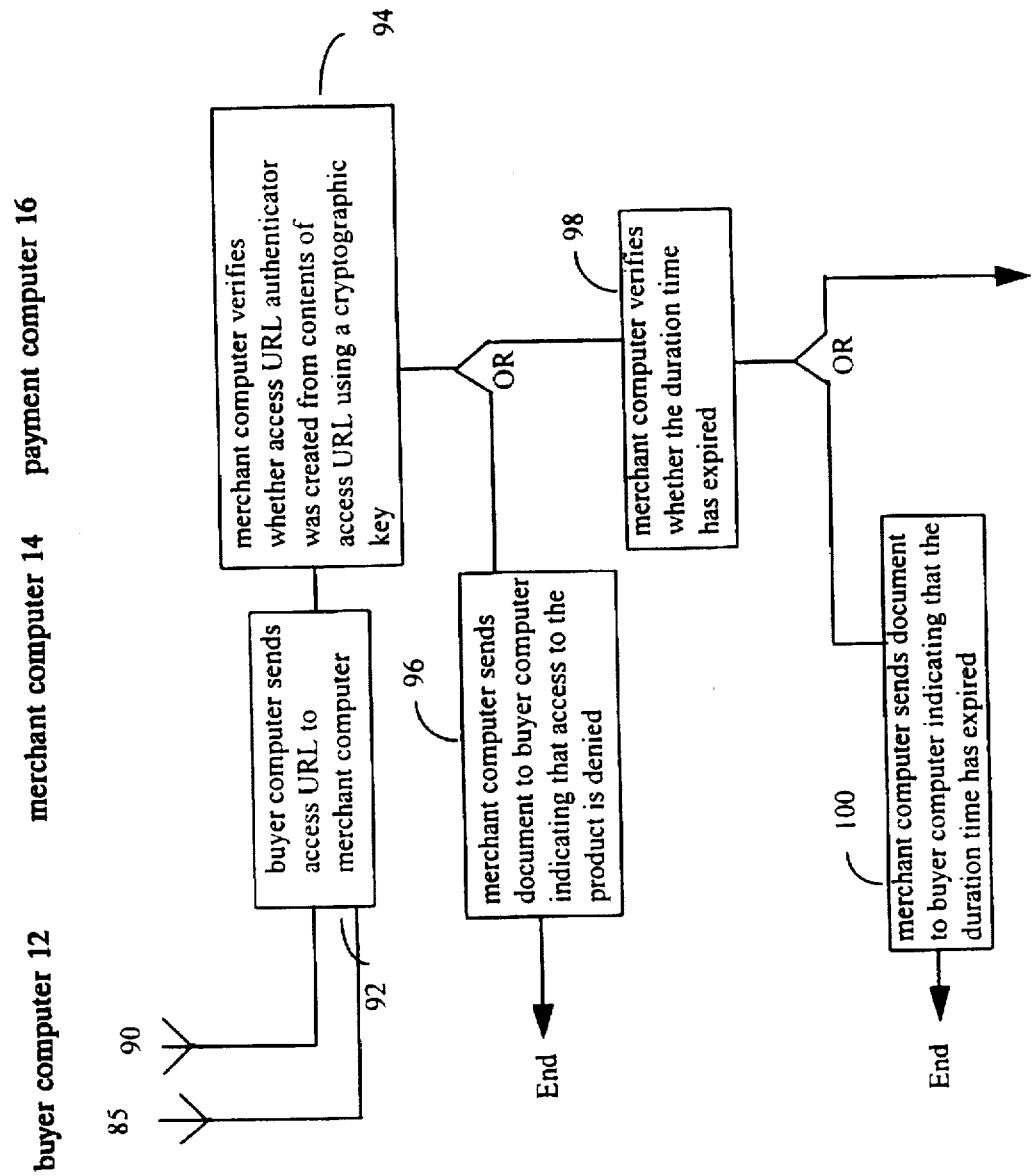

| File | Options | Navigate | Annotate | Help |

Document Title: Smart Statement for Test User

Document URL: http://payment.openmarket.com/in/nph-stateme

Information about the item.

Transactions in October 1994

```
Mon Oct 3  Test Merchant Dilbert subscription 20 seconds amount $0.10
Tue Oct 4  Test Merchant Mead Data Central Article amount $2.95
Tue Oct 4  Test Merchant Mead Data Central Article amount $2.95
Tue Oct 4  Test Merchant Mead Data Central Article amount $2.95
Tue Oct 4  Test Merchant N.Y. Times Article amount $0.50
Tue Oct 4  Test Merchant Mead Data Central Article amount $2.95
Wed Oct 5  Test Merchant Mead Data Central Article amount $2.95
Wed Oct 5  Test Merchant Mead Data Central Article amount $2.95
Wed Oct 5  Test Merchant Mead Data Central Article amount $2.95
Wed Oct 5  Test Merchant Mead Data Central Article amount $2.95
Wed Oct 5  Test Merchant Mead Data Central Article amount $2.95
Wed Oct 5  Test Merchant Mead Data Central Article amount $2.95
```

Your total is 33.05.

Previous Statements

- September 1994
- August 1994

Return to your Newest Statement

Feedback

You can send us comments and suggestions here.

[Back] [Forward] [Home] [Reload] [Open...] [Save As...] [Clone] [New Window] [Close Window]

NETWORK SALES SYSTEM

REFERENCES TO APPENDICES

Microfiche appendices A–G, 4 sheets of 192 images total, are being submitted with the present application.

A claim of copyright is hereby made by Open Market, Incorporated with respect to the software code contained in the microfiche appendices, as of the date of first issuance of a U.S. patent based on this application. The copyright owner has no objection to the facsimile reproduction by anyone of the microfiche appendices as they appear in the Patent and Trademark office patent file or records, but reserves all other copyright rights whatsoever.

This invention relates to user-interactive network sales systems for implementing an open marketplace for goods or services over computer networks such as the Internet.

U.S. patent application Ser. No. 08/168,519, filed Dec. 16, 1993 by David K. Gifford and entitled "Digital Active Advertising," the entire disclosure of which is hereby incorporated herein in its entirety by reference, now abandoned, describes a network sales system that includes a plurality of buyer computers, a plurality of merchant computers, and a payment computer. A user at a buyer computer asks to have advertisements displayed, and the buyer computer requests advertisements from a merchant computer, which sends the advertisements to the buyer computer. The user then requests purchase of an advertised product, and the buyer computer sends a purchase message to the merchant computer. The merchant computer constructs a payment order that it sends to the payment computer, which authorizes the purchase and sends an authorization message to the merchant computer. When the merchant computer receives the authorization message it sends the product to the buyer computer.

The above-mentioned patent application also describes an alternative implementation of the network sales system in which, when the user requests purchase of an advertised product, the buyer computer sends a payment order directly to the payment computer, which sends an authorization message back to the buyer computer that includes an unforgeable certificate that the payment order is valid. The buyer computer then constructs a purchase message that includes the unforgeable certificate and sends it to the merchant computer. When the merchant computer receives the purchase request it sends the product to the buyer computer, based upon the pre-authorized payment order.

SUMMARY OF THE INVENTION

In one aspect, the invention provides a network-based sales system that includes at least one buyer computer for operation by a user desiring to buy a product, at least one merchant computer, and at least one payment computer. The buyer computer, the merchant computer, and the payment computer are interconnected by a computer network. The buyer computer is programmed to receive a user request for purchasing a product, and to cause a payment message to be sent to the payment computer that comprises a product identifier identifying the product. The payment computer is programmed to receive the payment message, to cause an access message to be created that comprises the product identifier and an access message authenticator based on a cryptographic key, and to cause the access message to be sent to the merchant computer. The merchant computer is programmed to receive the access message, to verify the access message authenticator to ensure that the access message authenticator was created using the cryptographic key, and to cause the product to be sent to the user desiring to buy the product.

The invention provides a simple design architecture for the network sales system that allows the merchant computer to respond to payment orders from the buyer computer without the merchant computer having to communicate directly with the payment computer to ensure that the user is authorized to purchase the product and without the merchant computer having to store information in a database regarding which buyers are authorized to purchase which products. Rather, when the merchant computer receives an access message from the buyer computer identifying a product to be purchased, the merchant computer need only check the access message to ensure that it was created by the payment computer (thereby establishing for the merchant computer that the buyer is authorized to purchase the product), and then the merchant computer can cause the product to be sent to the buyer computer who has been authorized to purchase the product.

In another aspect, the invention features a network-based sales system that includes at least one buyer computer for operation by a user desiring to buy products, at least one shopping cart computer, and a shopping cart database connected to the shopping cart computer. The buyer computer and the shopping cart computer are interconnected by a computer network. The buyer computer is programmed to receive a plurality of requests from a user to add a plurality of respective products to a shopping cart in the shopping cart database, and, in response to the requests to add the products, to send a plurality of respective shopping cart messages to the shopping cart computer each of which includes a product identifier identifying one of the plurality of products. The shopping cart computer is programmed to receive the plurality of shopping cart messages, to modify the shopping cart in the shopping cart database to reflect the plurality of requests to add the plurality of products to the shopping cart, and to cause a payment message associated with the shopping cart to be created. The buyer computer is programmed to receive a request from the user to purchase the plurality of products added to the shopping cart and to cause the payment message to be activated to initiate a payment transaction for the plurality of products added to the shopping cart.

In another aspect, the invention features a network-based link message system that includes at least one client computer for operation by a client user and at least one server computer for operation by a server user. The client computer and the server computer are interconnected by a computer network. The client computer is programmed to send an initial link message to the server computer. The server computer is programmed to receive the initial link message from the client computer and to create, based on information contained in the initial link message, a session link message that encodes a state of interaction between the client computer and the server computer. The session link message includes a session link authenticator, computed by a cryptographic function of the session link contents, for authenticating the session link message. The server computer is programmed to cause the session link message to be sent to the client computer. The client computer is programmed to cause the session link message to be sent to a computer in the network that is programmed to authenticate the session link message by examining the session link authenticator and that is programmed to respond to the session link message based on the state of the interaction between the client computer and the server computer.

In another aspect, the invention features a network-based sales system that includes a merchant database having a plurality of digital advertisements and a plurality of respective product fulfillment items, at least one creation computer for creating the merchant database, and at least one merchant computer for causing the digital advertisements to be transmitted to a user and for causing advertised products to be transmitted to the user. The creation computer and the merchant computer are interconnected by a computer network. The creation computer is programmed to create the merchant database, and to transmit the digital advertisements and the product fulfillment items to the merchant computer. The merchant computer is programmed to receive the digital advertisements and product fulfillment items, to receive a request for a digital advertisement from a user, to cause the digital advertisement to be sent to the user, to receive from the user an access message identifying an advertised product, and to cause the product to be sent to the user in accordance with a product fulfillment item corresponding to the product.

In another aspect, the invention features a hypertext statement system that includes a client computer for operation by a client user and one or more server computers for operation by a server user. The client computer and the server computers are interconnected by a computer network. At least one of the server computers is programmed to record purchase transaction records in a database. Each of the purchase transaction records includes a product description. The server computer is programmed to transmit a statement document that includes the purchase transaction records to the client computer. The client computer is programmed to display the product descriptions, to receive a request from the client user to display a product corresponding to a product description displayed by the client computer, and to cause a product hypertext link derived from a purchase transaction record to be activated. At least one of the server computers is programmed to respond to activation of the product hypertext link by causing the product to be sent to the client computer.

In another aspect, the invention features a network payment system that includes at least one buyer computer for operation by a user desiring to buy a product and at least one payment computer for processing payment messages from the buyer computer. The buyer computer and the payment computer are interconnected by a computer network. The buyer computer is programmed to cause a payment message to be sent to the payment computer. The payment message includes a product identifier identifying the product that the user desires to buy. The payment computer is programmed to receive the payment message, to cause an access message to be created to enable the user to access the product, and to record a purchase transaction record in the settlement database. The buyer computer is programmed to cause a request for purchase transaction records to be sent to the payment computer. The payment computer is programmed to receive the request for purchase transaction records and to cause a document derived from the purchase transaction records to be sent to the buyer computer.

BRIEF DESCRIPTION OF THE DRAWINGS

FIG. 11 is a screen snapshot of a smart statement document that the payment computer sends to the buyer computer in FIG. 4.

DETAILED DESCRIPTION

Figure 1:
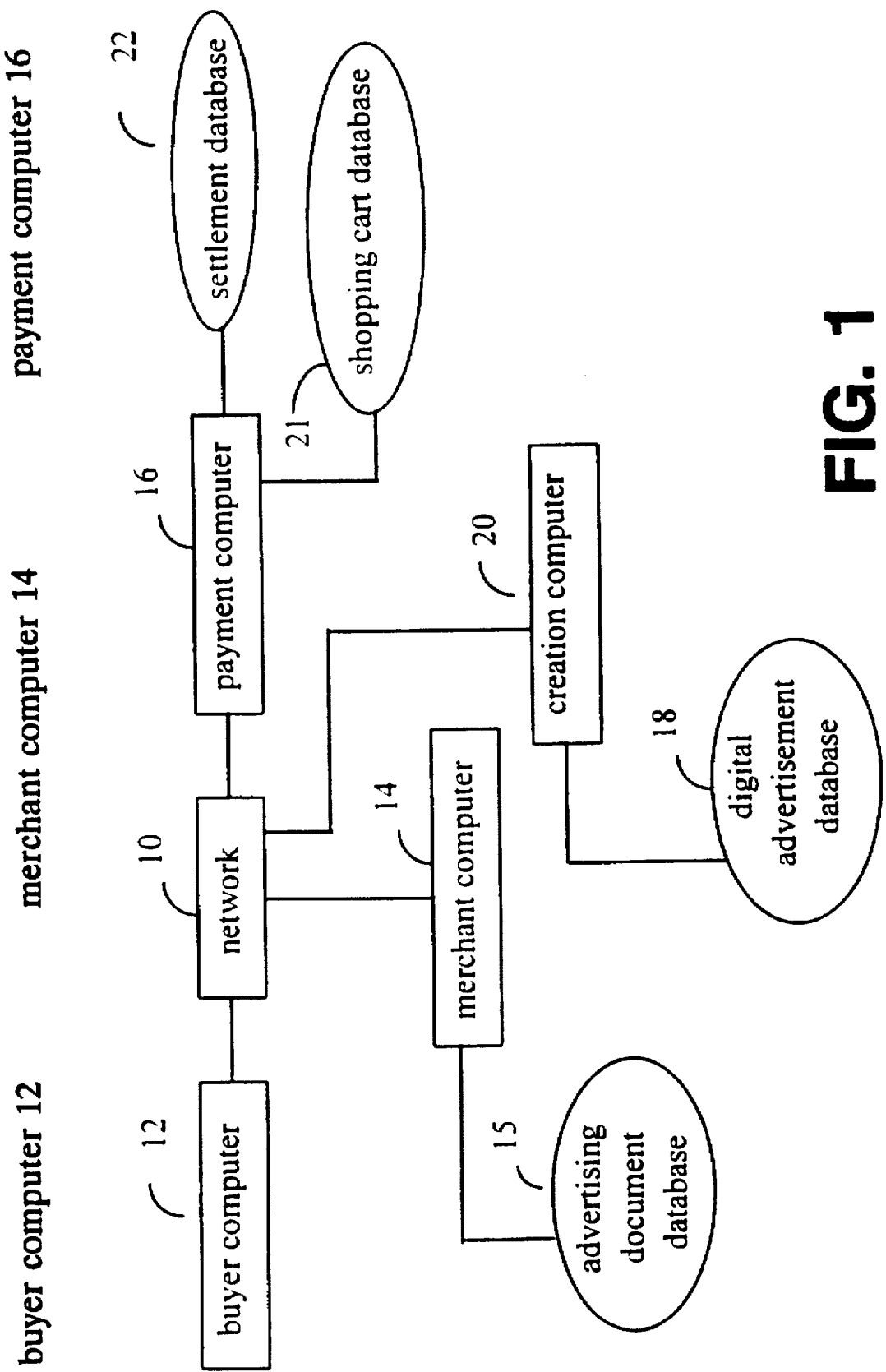
FIG. 1 is a block diagram of a network sales system in accordance with the present invention.
Figure 2A:
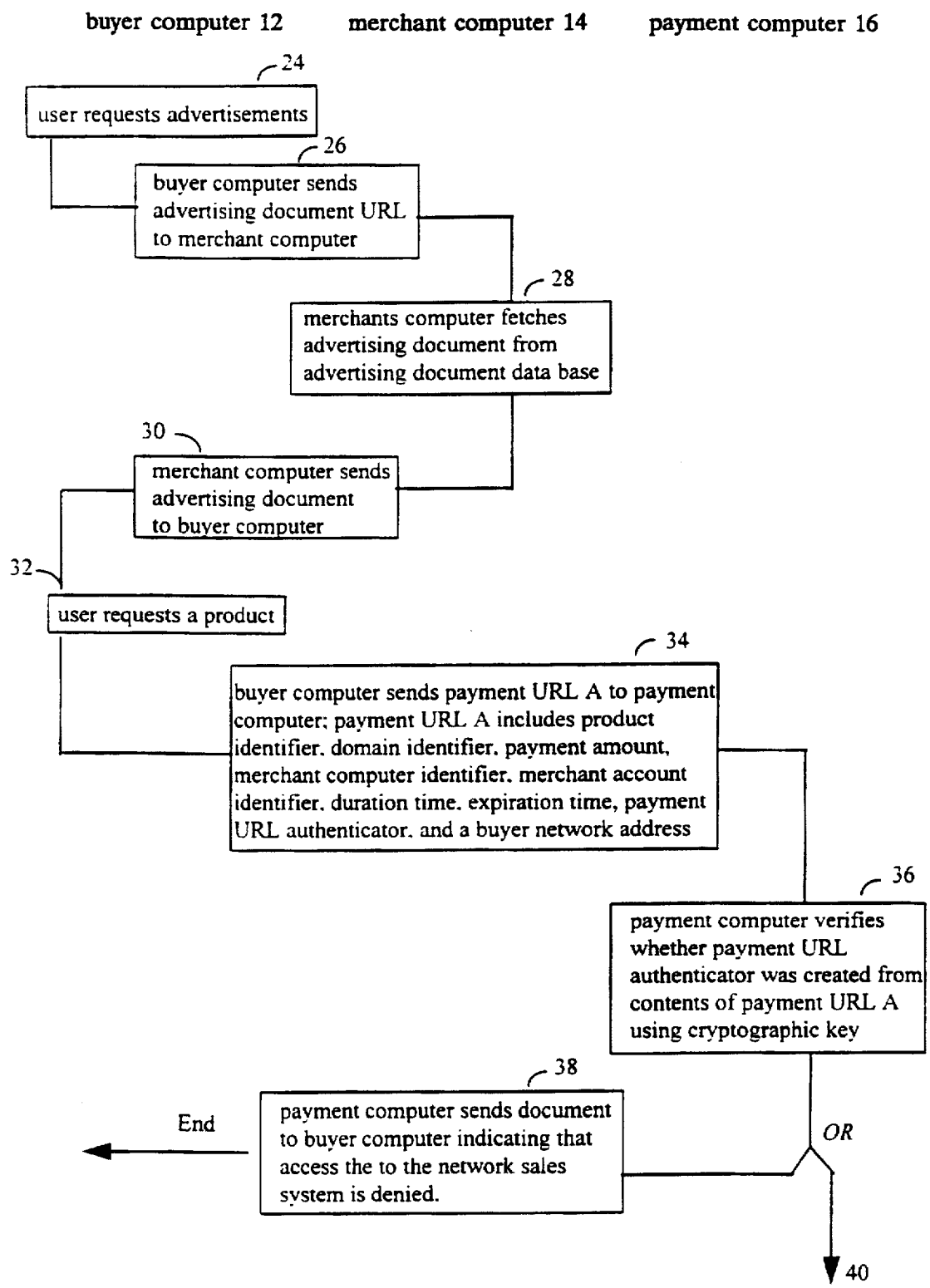
FIG. 2 (2-A through 2-I) is a flowchart diagram illustrating the operation of a purchase transaction in the network sales system of FIG. 1.
Figure 2B:
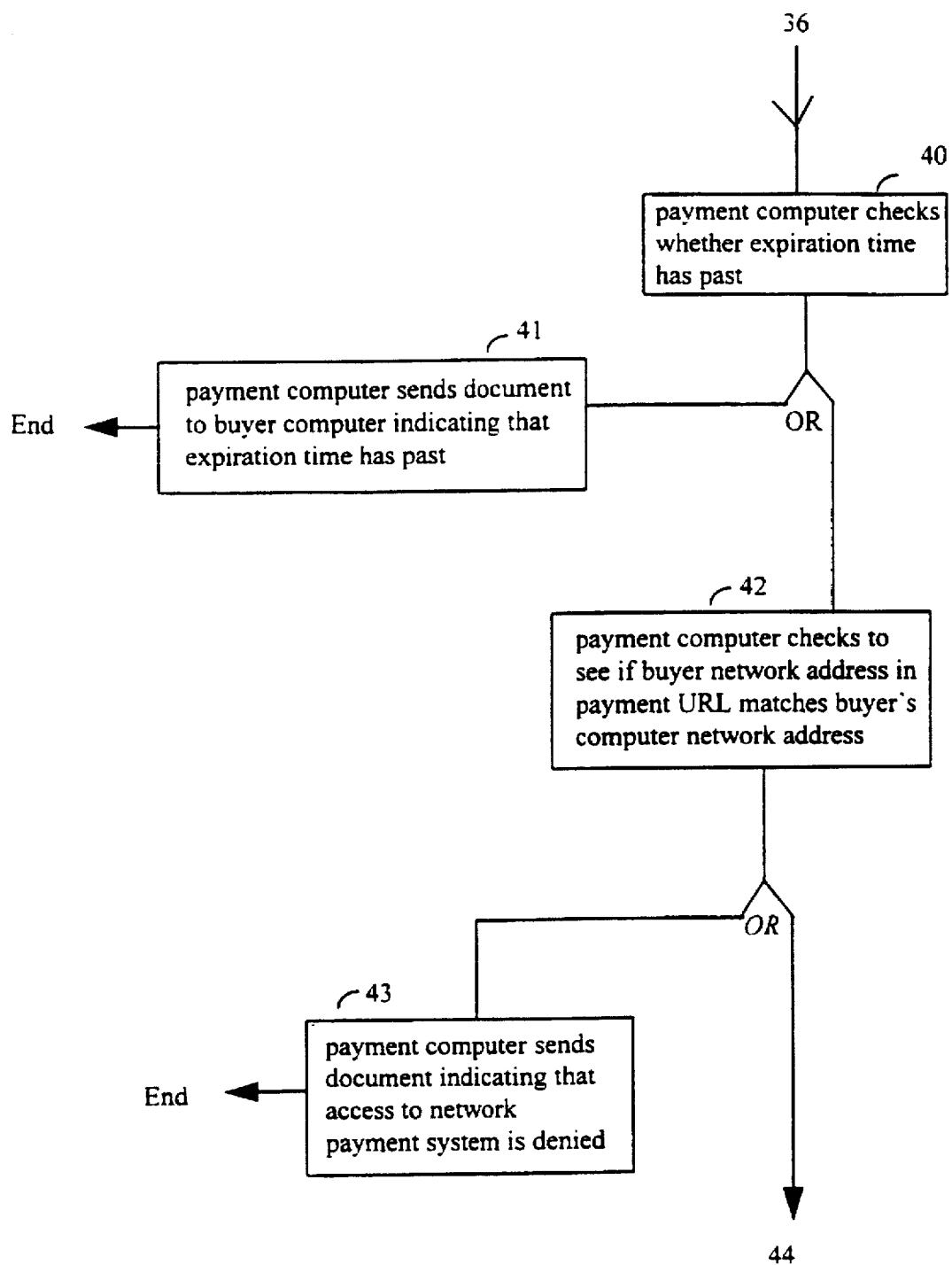
Figure 2C:
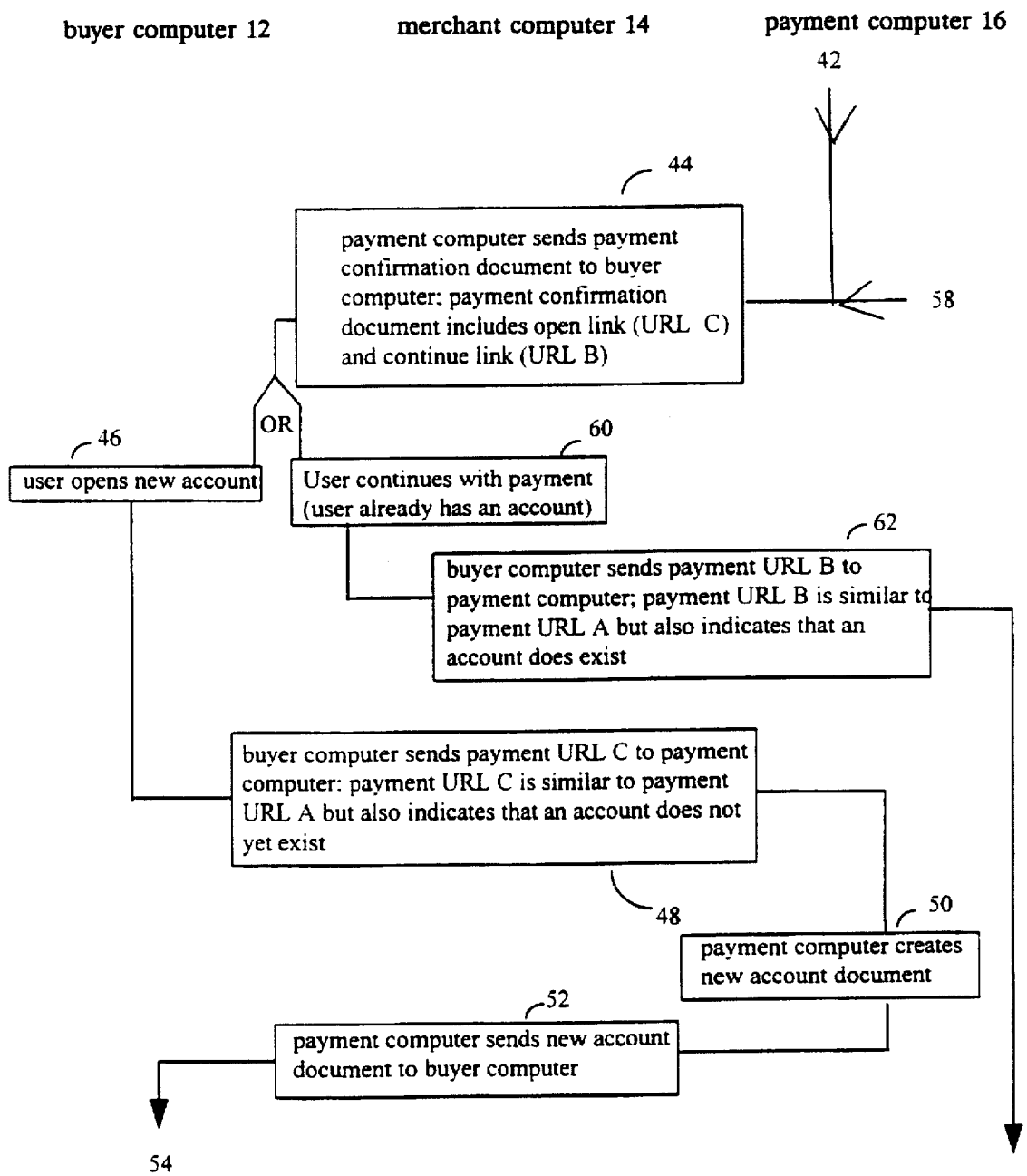
Figure 2D:
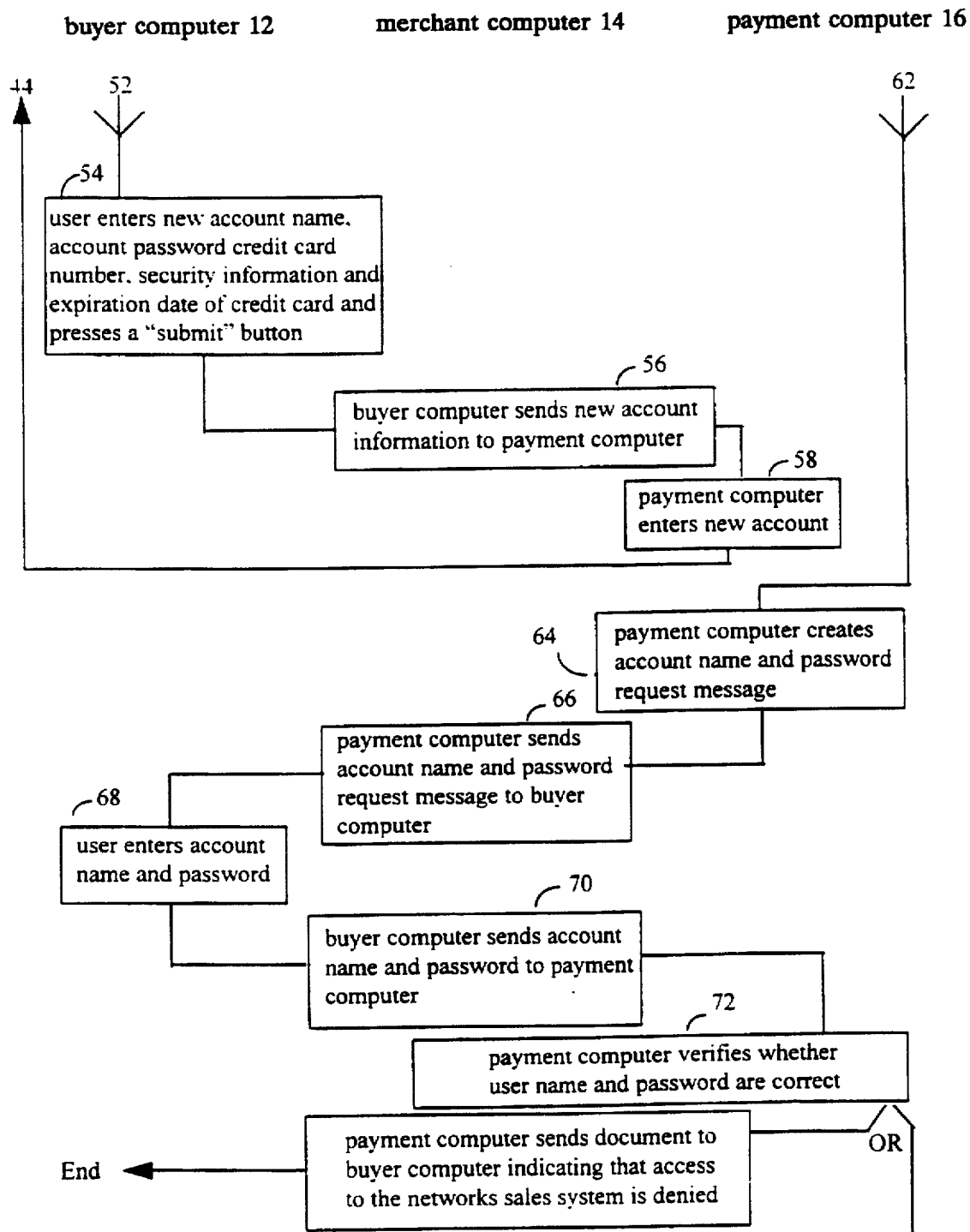
Figure 2E:
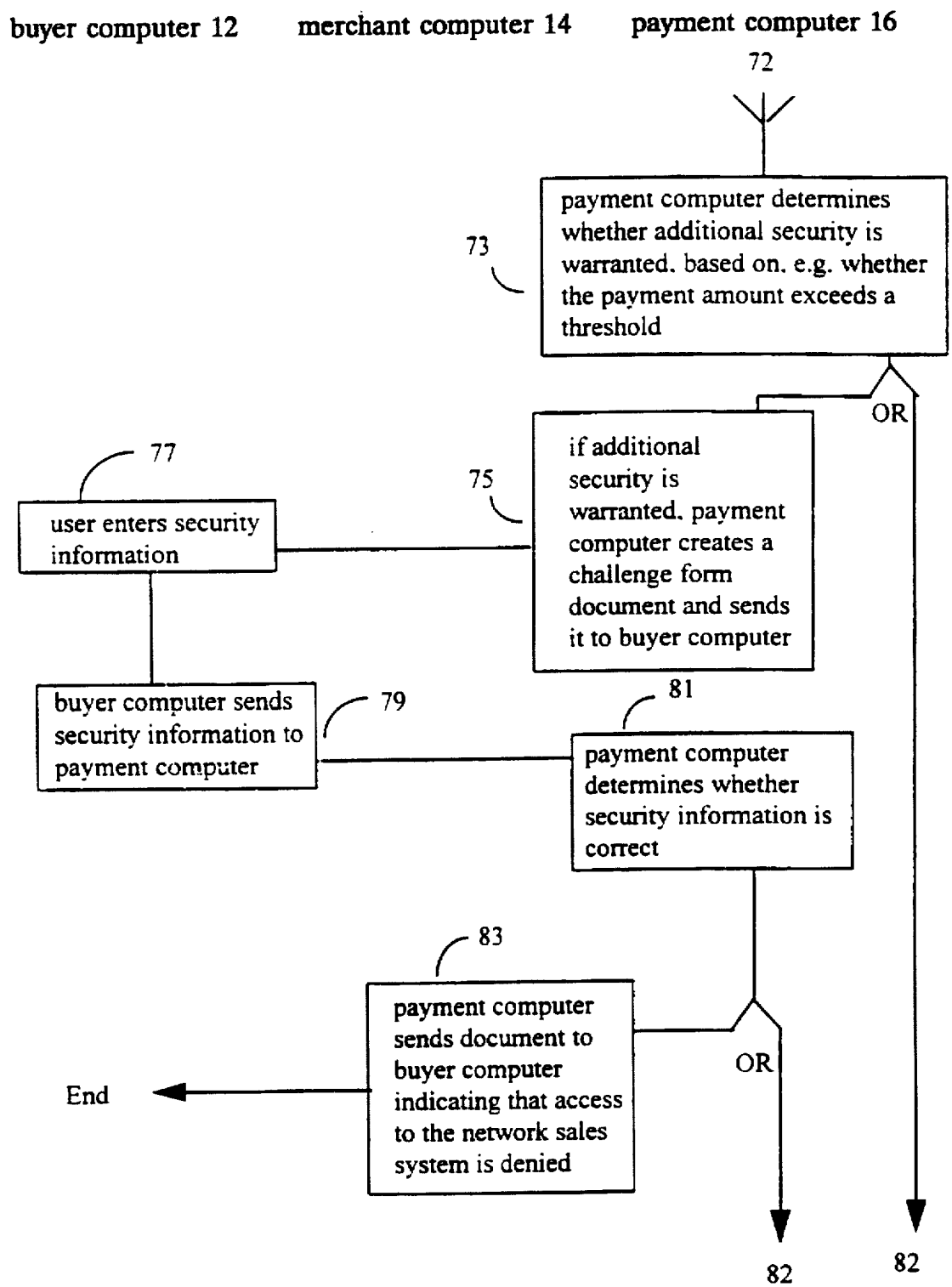
Figure 2F:
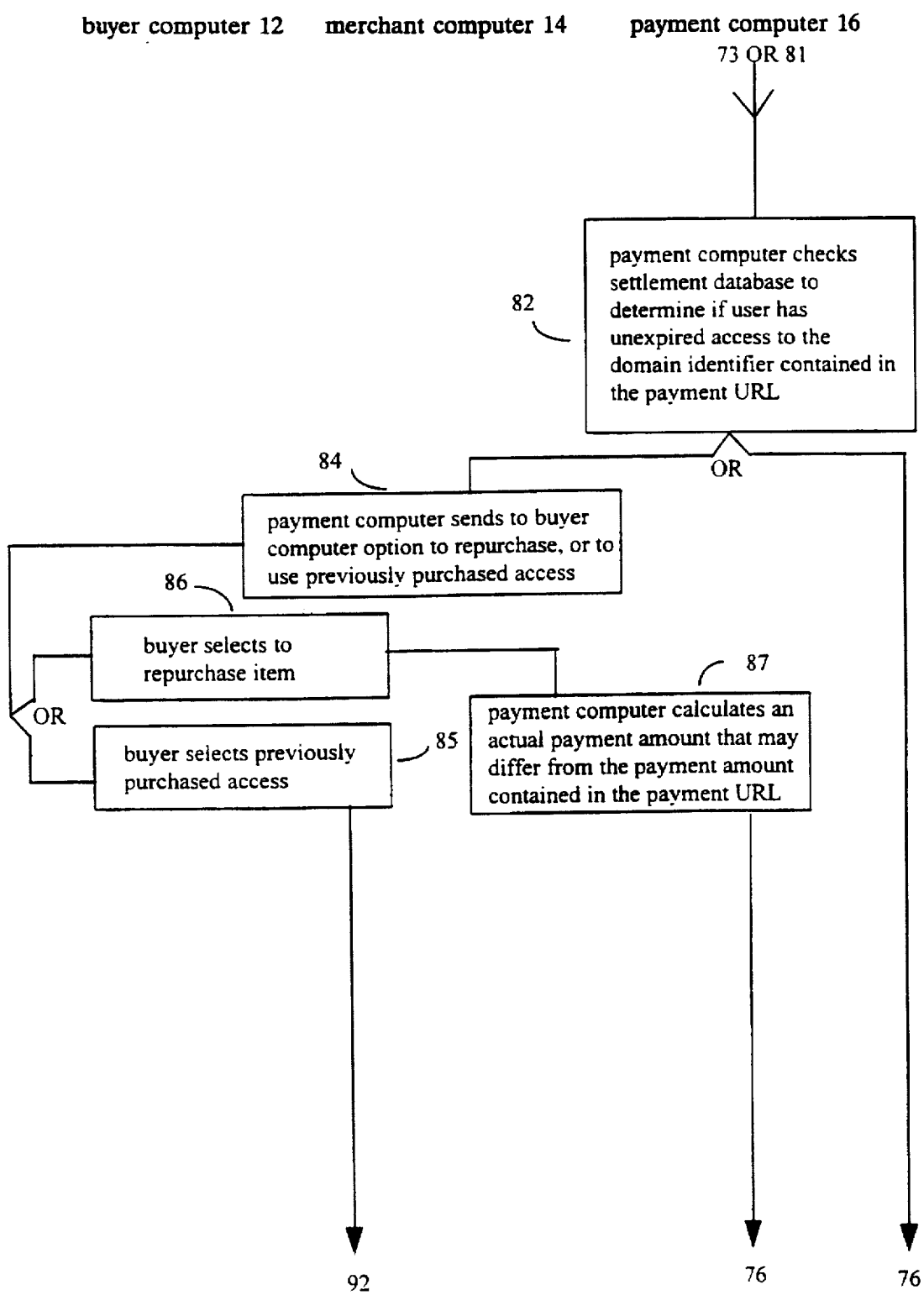
Figure 2G:
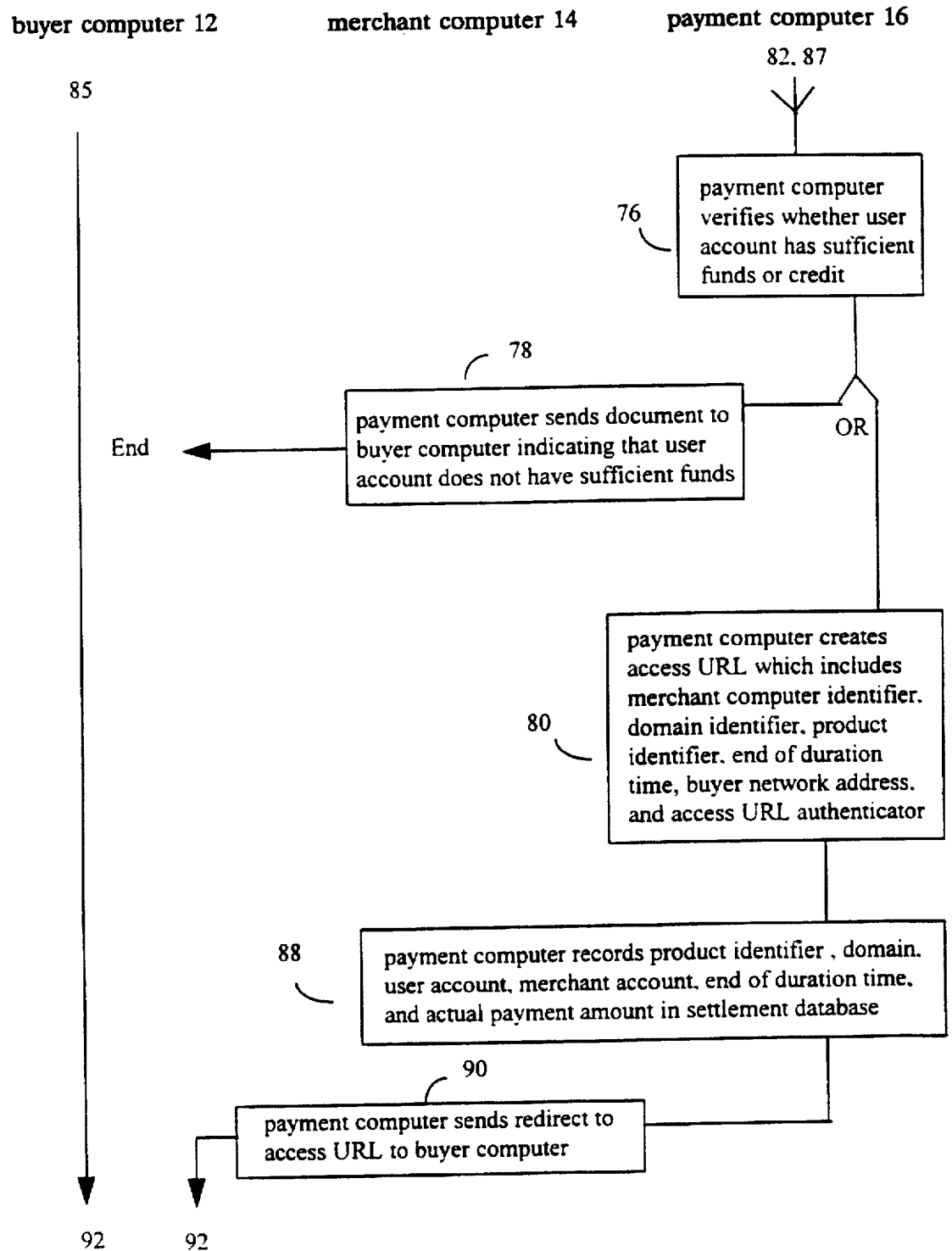
Figure 21:
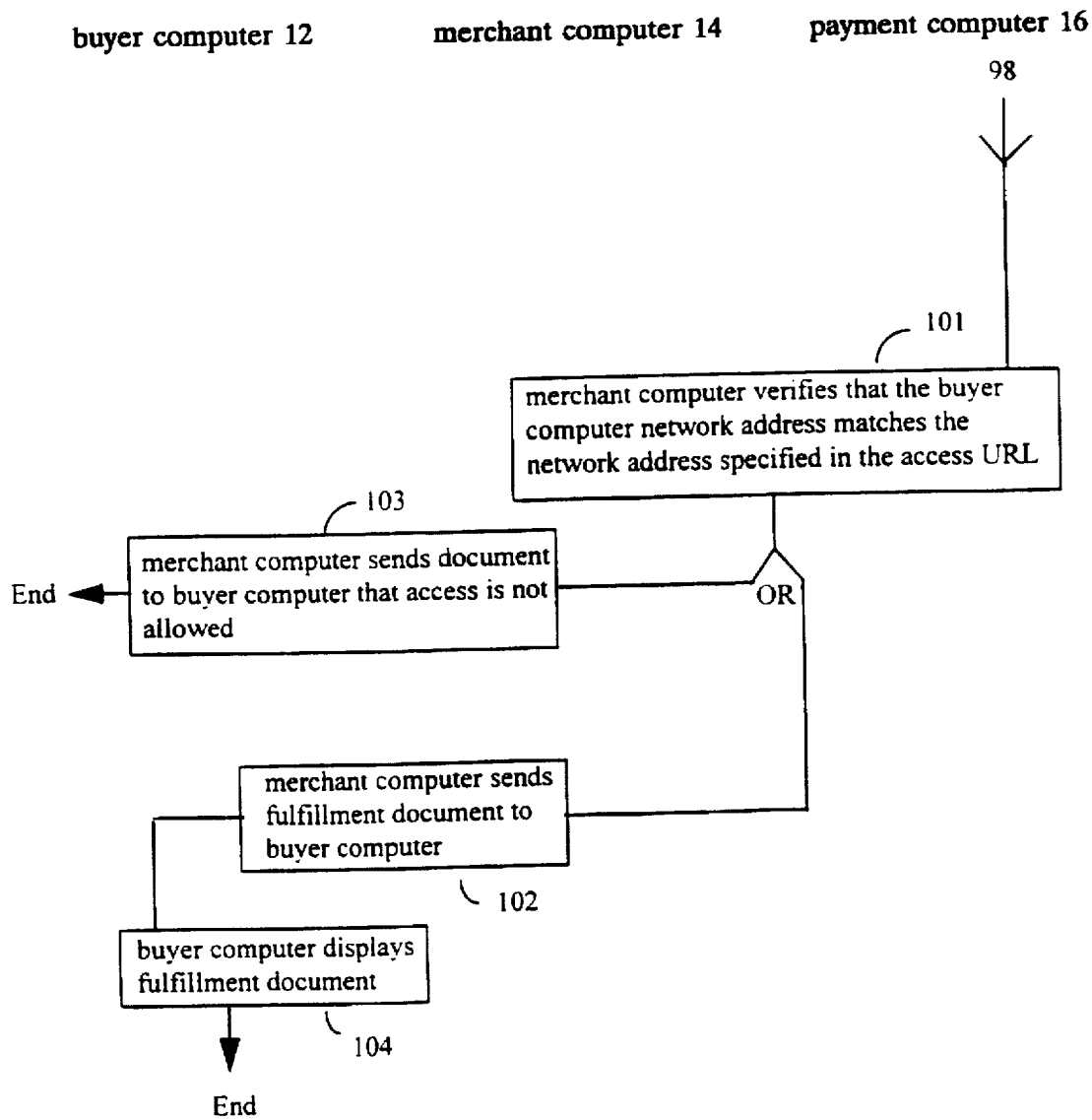

With reference to FIG. 1, a network sales system in accordance with the present invention includes a buyer computer 12 operated by a user desiring to buy a product, a merchant computer 14, which may be operated by a merchant willing to sell products to the buyer or by a manager of the network sales system, a payment computer 16 typically operated by a manager of the network sales system, and a creation computer 20 typically operated by the merchant. The buyer, merchant, payment, and creation computers are all inter-connected by a computer network 10 such as the Internet.

Creation computer 20 is programmed to build a "store" of products for the merchant. A printout of a computer program for use in creating such a "store" in accordance with the present invention is provided as Appendix F.

The products advertised by merchant computer 14 may be, for example, newspaper or newsletter articles available for purchase by buyers. Creation computer 20 creates a digital advertisement database 18 that stores advertising documents (which may for example be in the form of summaries of newspaper or newsletter articles, accompanied by prices) and product fulfillment items (which may be the products themselves if the products can be transmitted over the network, or which may be hard goods identifiers if the products are hard goods, i.e., durable products as opposed to information products). Creation computer 20 transmits contents of the advertising document database 18 to merchant computer 14 to enable the merchant computer to cause advertisements and products to be sent to buyers. Merchant computer 14 maintains advertising documents locally in advertising document database 15. In an alternative embodiment, the creation computer does not have a local digital advertisement database, but instead updates a remote advertising document database on a merchant computer. These updates can be accomplished using HTML forms or other remote database technologies as is understood by practitioners of the art.

Payment computer 16 has access to a settlement database 22 in which payment computer 16 can record details of purchase transactions. The products may be organized into various "domains" of products, and payment computer 16 can access settlement database 22 to record and retrieve records of purchases of products falling within the various domains. Payment computer 16 also has access to a shopping cart database 21 in which a "shopping cart" of products that a user wishes to purchase can be maintained as the user shops prior to actual purchase of the contents of the shopping cart.

Figure 5:
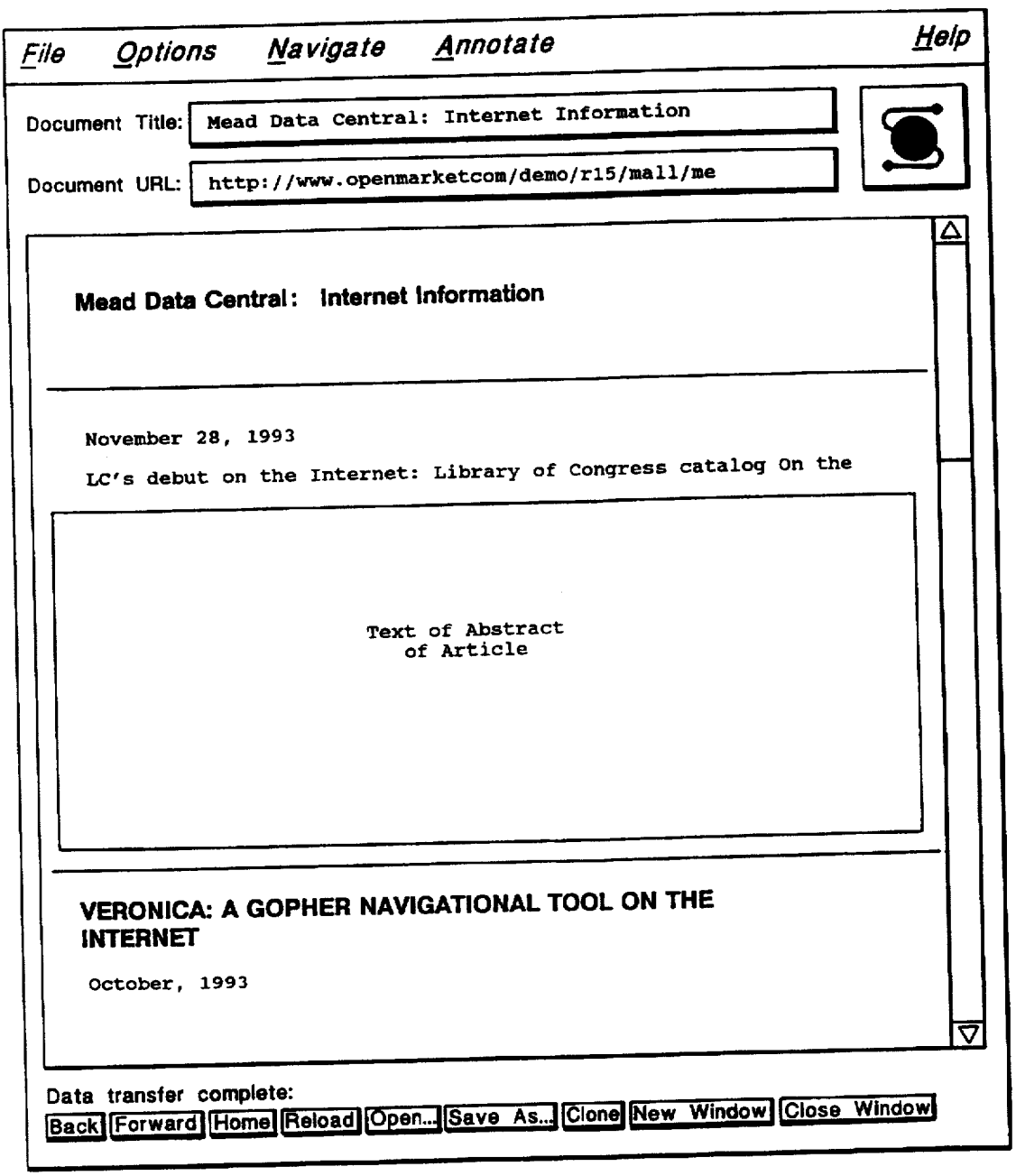
FIG. 5 is a screen snapshot of an advertising document that the merchant computer sends to the buyer computer in FIG. 2.

With reference to FIG. 2, a purchase transaction begins when a user at buyer computer 12 requests advertisements (step 24) and buyer computer 12 accordingly sends an advertising document URL (universal resource locator) to merchant computer 14 (step 26). The merchant computer fetches an advertising document from the advertising document database (step 28) and sends it to the buyer computer (step 30). An example of an advertising document is shown in FIG. 5. Details of URLs and how they are used are found in the microfiche Appendix G.

The user browses through the advertising document and eventually requests a product (step 32). This results in the buyer computer sending payment URL A to the payment computer (step 34). Payment URL A includes a product identifier that represents the product the user wishes to buy, a domain identifier that represents a domain of products to which the desired product belongs, a payment amount that represents the price of the product, a merchant computer identifier that represents merchant computer 14, a merchant account identifier that represents the particular merchant account to be credited with the payment amount, a duration time that represents the length of time for which access to the product is to be granted to the user after completion of the purchase transaction, an expiration time that represents a deadline beyond which this particular payment URL cannot be used, a buyer network address, and a payment URL authenticator that is a digital signature based on a cryptographic key. The payment URL authenticator is a hash of other information in the payment URL, the hash being defined by a key shared by the merchant and the operator of the payment computer.

In an alternative embodiment, step 34 consists of the buyer computer sending a purchase product message to the merchant computer, and the merchant computer provides payment VRL A to the buyer computer in response to the purchase product message. In this alternative embodiment, payment URL A contains the same contents as above. The buyer computer then sends the payment URL A it has received from the merchant computer to the payment computer.

When the payment computer receives the payment URL it verifies whether the payment URL authenticator was created from the contents of the payment URL using the cryptographic key (step 36). If not, the payment computer sends a document to the buyer computer indicating that access to the network sales system is denied (step 38). Otherwise, the payment computer determines whether the expiration time has past (step 40). If it has, the payment computer sends a document to the buyer computer indicating that the time has expired (step 41). Otherwise, the payment computer checks the buyer computer network address to see if it matches the one specified in the payment URL (step 42). If it does not match, the payment computer sends a document to the buyer computer indicating that access to the network payment system is denied (step 43). Otherwise, the payment computer sends a payment confirmation document to the buyer computer, the payment confirmation document including an "open" link and a "continue" link (step 44).

Figure 6:
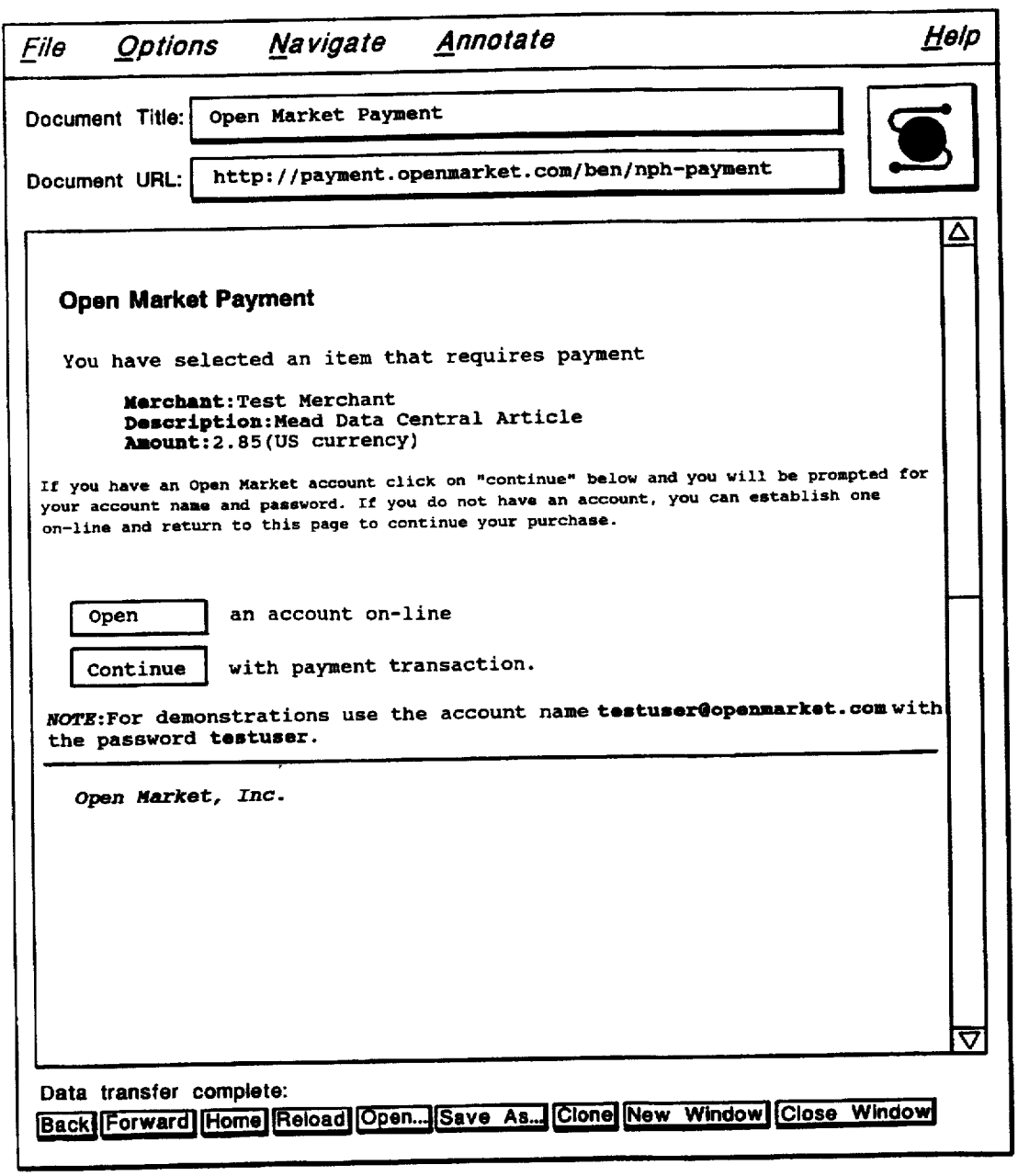
FIG. 6 is a screen snapshot of a confirmation document that the payment computer sends to the buyer computer in FIG. 2.

An example of a confirmation document is shown in FIG. 6. The confirmation document asks the user to click on a "continue" button if the user already has an account with the payment computer, or to click on an "open" button if the user does not already have an account and wishes to open one.

Figure 7:
FIG. 7 is a screen snapshot of a new account document that the payment computer sends to the buyer computer in FIG. 2.

If the user clicks on the "open" button (step 46), the buyer computer sends payment URL C to the payment computer (step 48), payment URL C being similar to payment URL A but also indicating that the user does not yet have an account. The payment computer creates a new account document (step 50) and sends it to the buyer computer (step 52). An example of a new account document is shown in FIG. 7. When the user receives the new account document he enters the new account name, an account password, a credit card number, the credit card expiration date, and security information such as the maiden name of the user's mother (step 54), and presses a "submit" button (not shown in FIG. 7). The buyer computer sends the new account information to the payment computer (step 56), which enters the new account in the settlement database (step 58).

Figure 8:
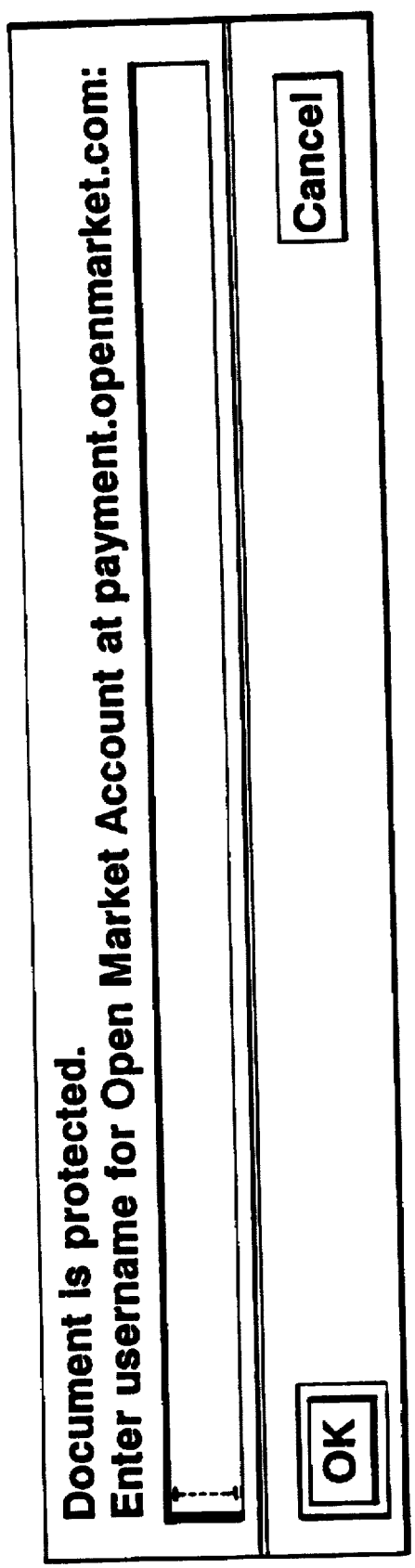
FIG. 8 is a screen snapshot of an account name prompt that the buyer computer creates in FIG. 2.

If the user clicks on the "continue" button (step 60), the buyer computer sends payment URL B to the payment computer (step 62), payment URL B being similar to payment URL A but also indicating that the user already has an account. The payment computer then instructs the buyer computer to provide the account name and password (steps 64 and 66), and the buyer computer prompts the user for this information by creating an account name prompt (example shown in FIG. 8) and a similar password prompt. The user enters the information (step 68) and the buyer computer sends the account name and password to the payment computer (step 70).

The payment computer verifies whether the user name and password are correct (step 72). If they are not correct, the payment computer sends a document to the buyer computer indicating that access to the network sales system is denied (step 74). Otherwise, the payment computer determines whether additional security is warranted, based on, e.g., whether the payment amount exceeds a threshold (step 73). If additional security is warranted, the payment computer creates a challenge form document and sends it to the buyer computer (step 75). The user enters the security information (step 77), the buyer computer sends the security information to the payment computer (step 79), and the payment computer determines whether the security information is correct (step 81). If it is not correct, the payment computer sends a document to the buyer computer indicating that access to the network sales system is denied (step 83).

Figure 9:
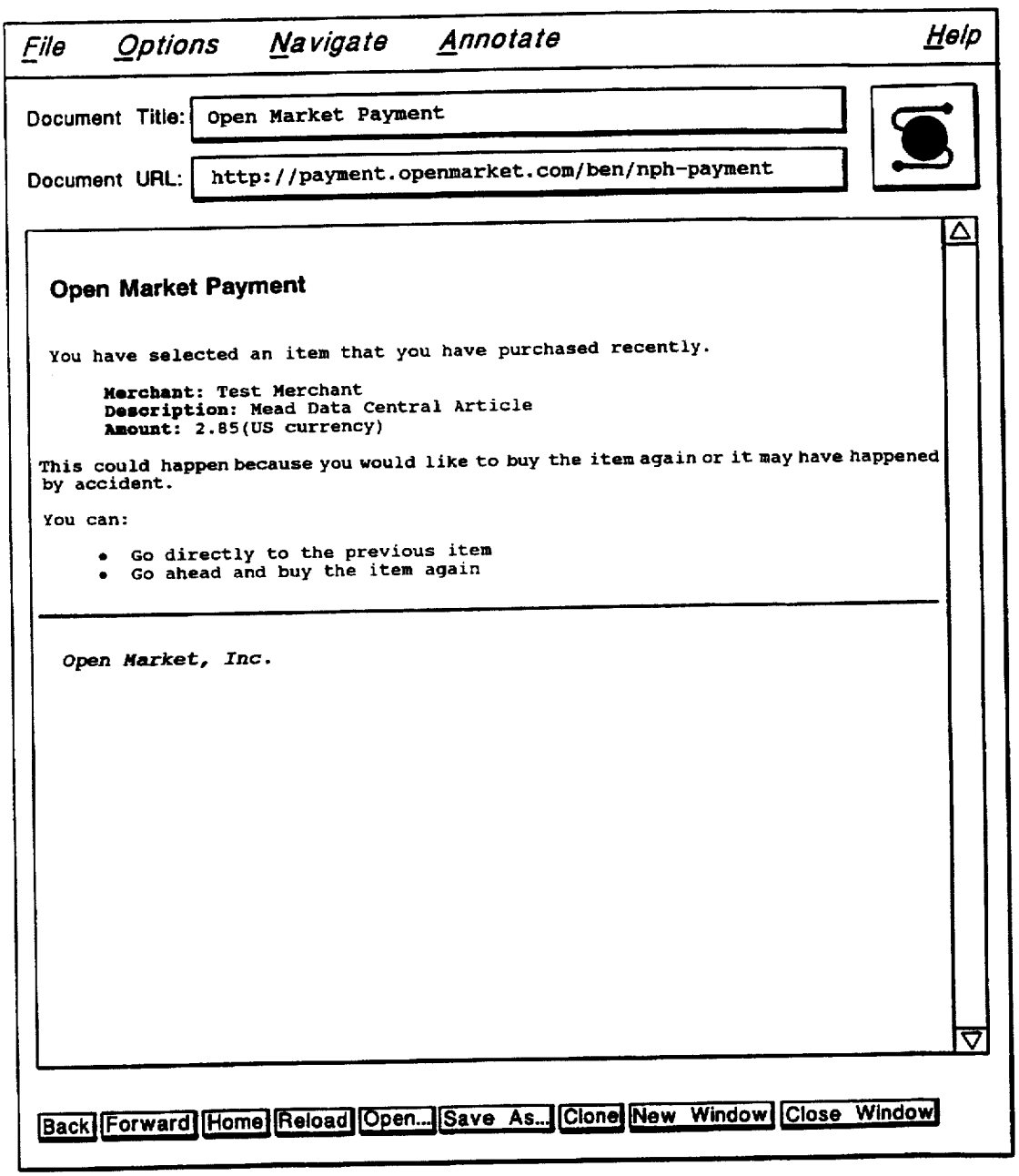
FIG. 9 is a screen snapshot of a document that the payment computer sends to the buyer computer in FIG. 2 and that provides an option either to repurchase or to use a previously purchased access.

If the security information is correct, or if additional security was not warranted, the payment computer checks the settlement database to determine whether the user has unexpired access to the domain identifier contained in the payment URL (step 82). If so, the payment computer sends to the buyer computer a document providing an option either to repurchase or to use the previously purchased access (step 84). An example of such a document is shown in FIG. 9. The user can respond to the recent purchase query document by choosing to access the previously purchased document (step 85) or to go ahead and buy the currently selected product (step 86).

If the user chooses to access the previously purchased document, the buyer computer skips to step 92 (see below). If the user chooses to buy the currently selected product, the payment computer calculates an actual payment amount that may differ from the payment amount contained in the payment URL (step 87). For example, the purchase of a product in a certain domain may entitle the user to access other products in the domain for free or for a reduced price for a given period of time.

The payment computer then verifies whether the user account has sufficient funds or credit (step 76). If not, the payment computer sends a document to the buyer computer indicating that the user account has insufficient funds (step 78). Otherwise, the payment computer creates an access URL (step 80) that includes a merchant computer identifier, a domain identifier, a product identifier, an indication of the end of the duration time for which access to the product is to be granted, the buyer network address, and an access URL authenticator that is a digital signature based on a cryptographic key. The access URL authenticator is a hash of other information in the access URL, the hash being defined by a key shared by the merchant and the operator of the payment computer. The payment computer then records the product identifier, the domain, the user account, the merchant account, the end of duration time, and the actual payment amount in the settlement database (step 88).

The payment computer then sends a redirect to access URL to the buyer computer (step 90), which sends the access URL to the merchant computer (step 92). The merchant computer verifies whether the access URL authenticator was created from the contents of the access URL using the cryptographic key (step 94). If not, the merchant computer sends a document to the buyer computer indicating that access to the product is denied (step 96).

Figure 10:
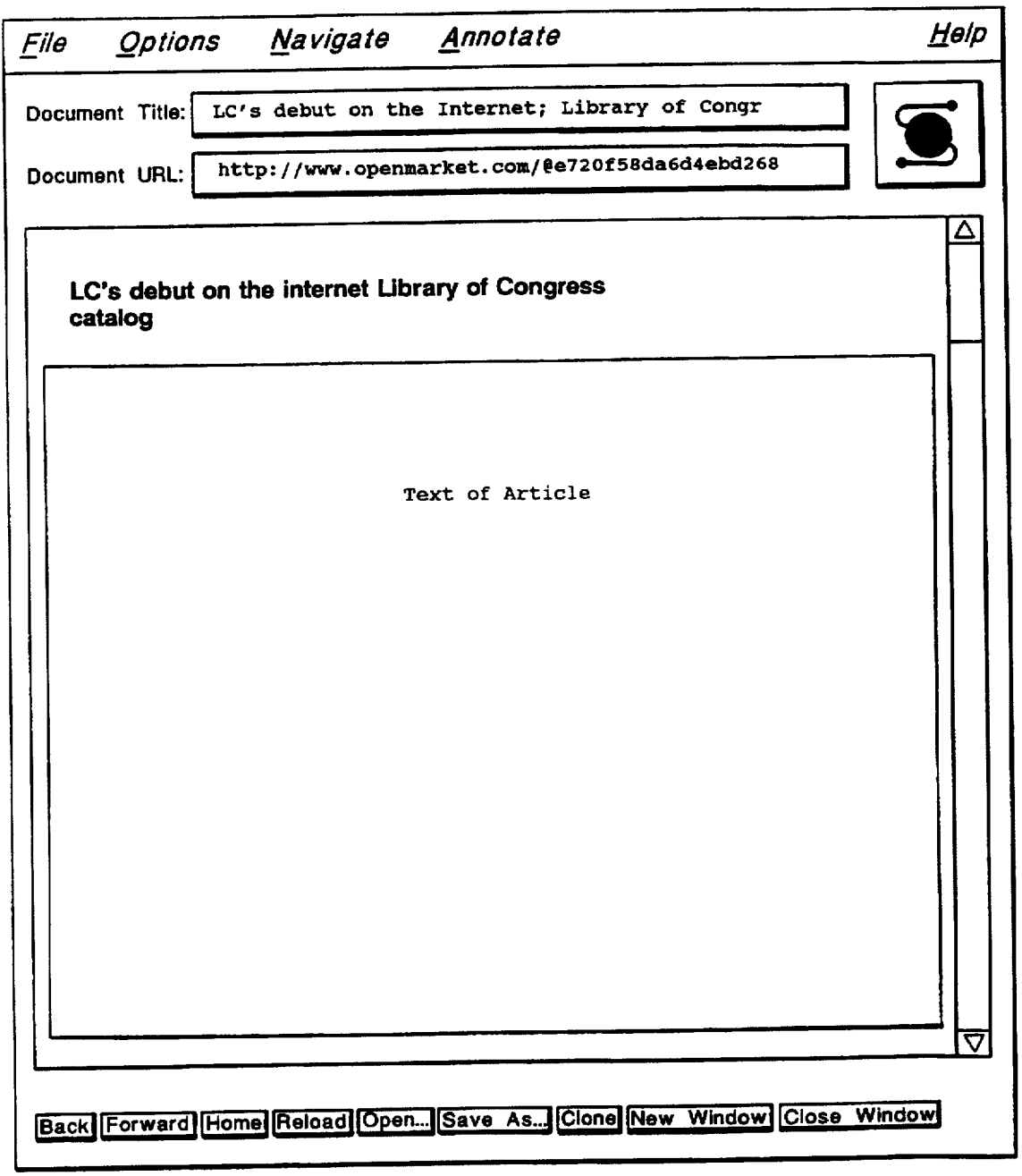
FIG. 10 is a screen snapshot of a fulfillment document that the merchant computer sends to the buyer computer in FIG. 2.

Otherwise, the merchant computer verifies whether the duration time for access to the product has expired (step 98). This is done because the buyer computer can request access to a purchased product repeatedly. If the duration time has expired, the merchant computer sends a document to the buyer computer indicating that the time has expired (step 100). Otherwise the merchant computer verifies that the buyer computer network address is the same as the buyer network address in the access URL (step 101), and if so, sends a fulfillment document to the buyer computer (step 102), which is displayed by the buyer computer (step 104). An example of a fulfillment document is shown in FIG. 10. Otherwise, the merchant computer sends a document to the buyer computer indicating that access is not allowed (step 103).

Figure 3A:
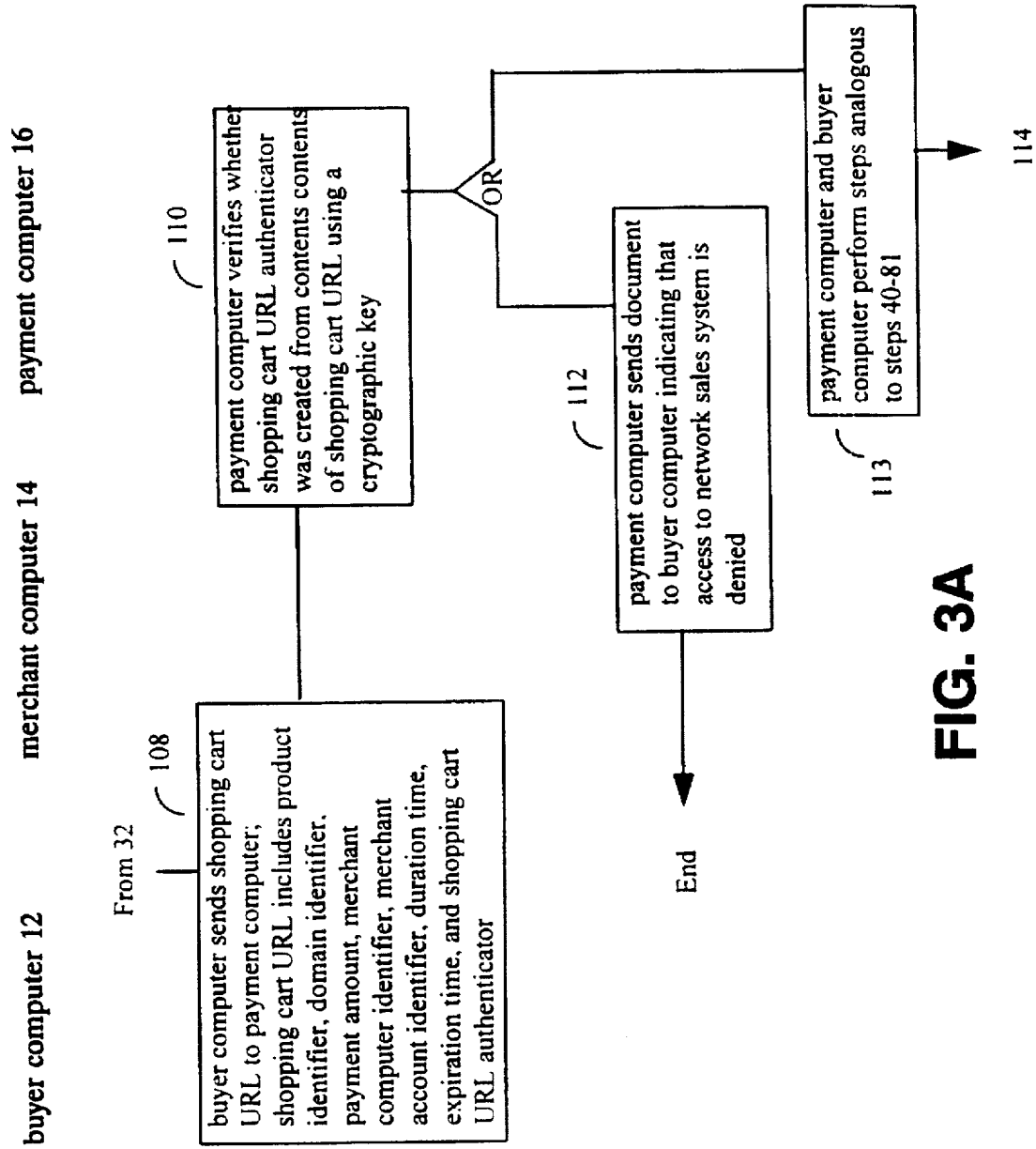
FIG. 3 (3-A through 3-B) is a flowchart diagram illustrating the use of a shopping cart for the purchase of products in connection with the network sales system of FIG. 1.
Figure 3B:
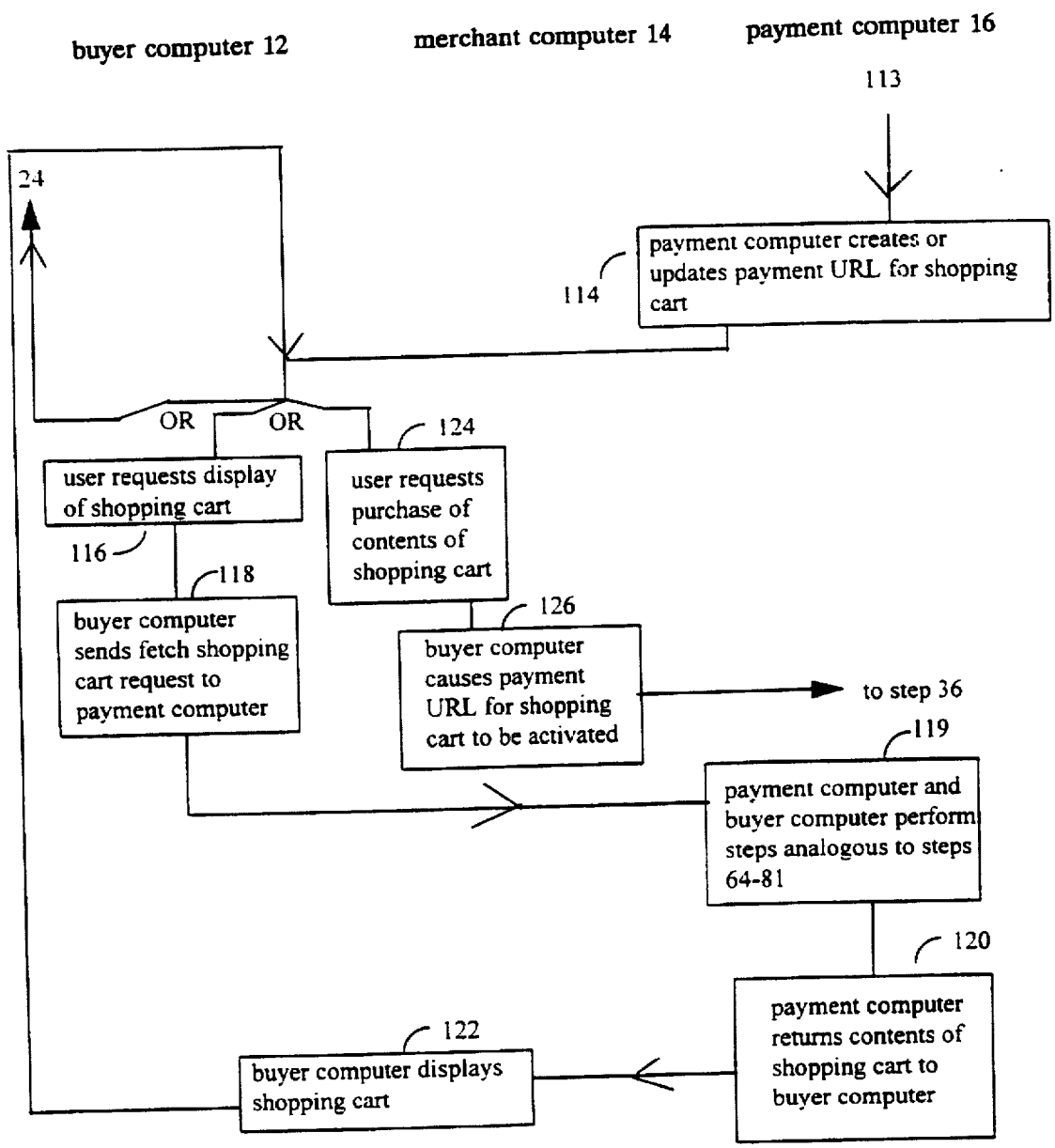

With reference now to FIG. 3, when the merchant computer sends the advertising document to the buyer computer, the user may request that a product be added to a shopping cart in the shopping cart database rather than request that the product be purchased immediately. The buyer computer sends a shopping cart URL to the payment computer (step 108), the shopping cart URL including a product identifier, a domain identifier, a payment amount, a merchant computer identifier, a merchant account identifier, a duration time, an expiration time, and a shopping cart URL authenticator that is a digital signature based on a cryptographic key. The shopping cart URL authenticator is a hash of other information in the shopping cart URL, the hash being defined by a key shared by the merchant and the operator of the payment computer.

The payment computer verifies whether the shopping cart URL authenticator was created from the contents of the shopping cart URL using a cryptographic key (step 110). If not, the payment computer sends a document to the buyer computer indicating that access to the network sales system is denied (step 112). Otherwise, before any modification to a user's shopping cart is allowed, user authentication is performed (step 113) in a manner analogous to steps 40–81. Once the user is authenticated, the payment computer creates or updates a payment URL for the shopping cart (step 114).

The user then either requests more advertisements (step 24 in FIG. 2) and possibly adds another product to the shopping cart, requests display of the shopping cart (step 116), or requests purchase of the entire contents of the shopping cart (step 124). If the user requests display of the shopping cart (step 116), the buyer computer sends a fetch shopping cart request to the payment computer (step 118), and the payment computer and buyer computer (step 119) perform steps analogous to steps 64–81. The payment computer returns the contents of the shopping cart to the buyer computer (step 120), which displays the contents of the shopping cart (step 122). If the user requests that the entire contents of the shopping cart be purchased (step 124) the buyer computer causes the payment URL for the shopping cart to be activated (step 126) and the payment URL is processed in a manner analogous to the processing of payment URLs for individual products (beginning with step 36 in FIG. 2).

Figure 4A:
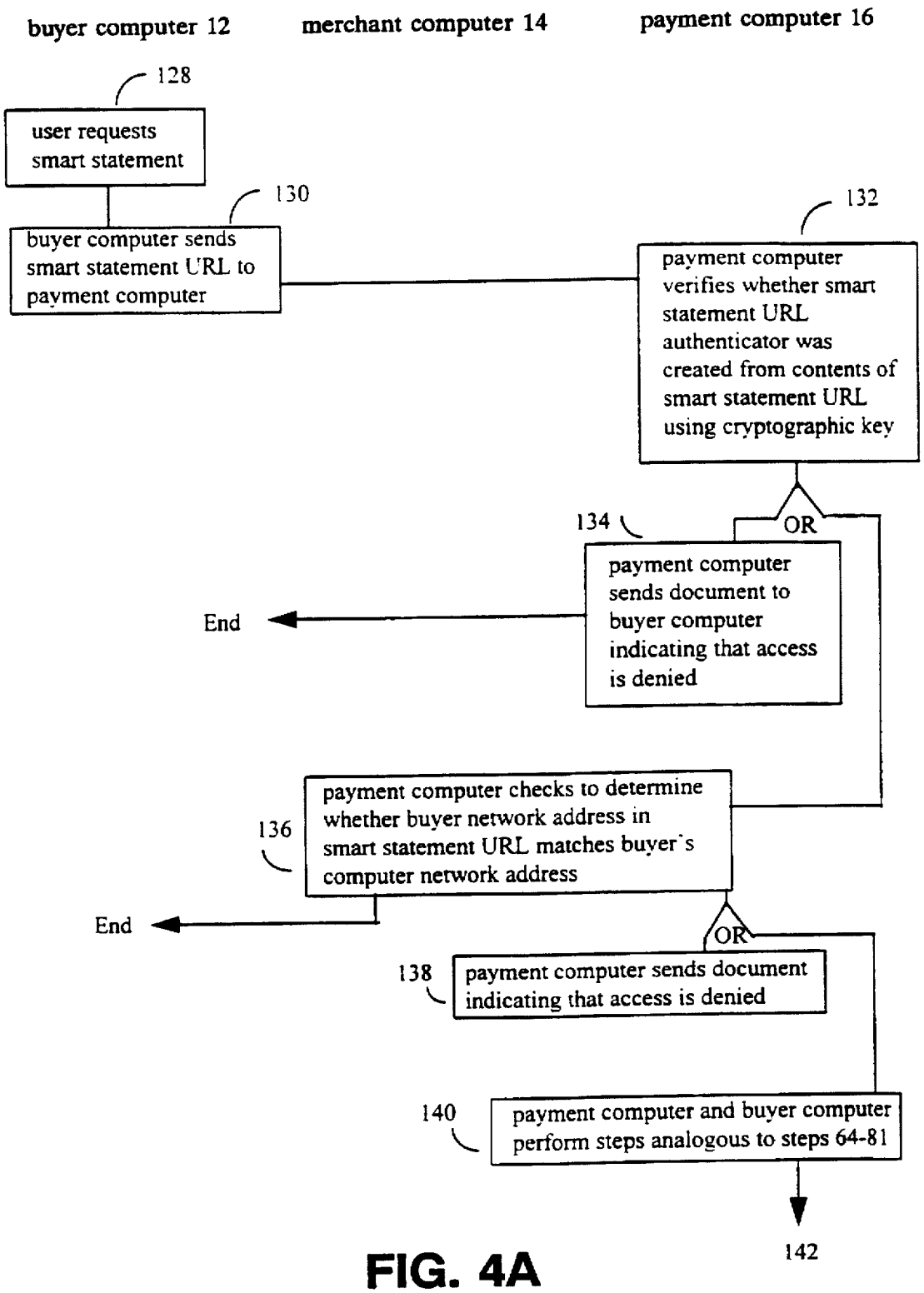
FIG. 4 (4-A through 4-C) is a flowchart diagram illustrating the operation of a smart statement in the network sales system of FIG. 1.
Figure 4B:
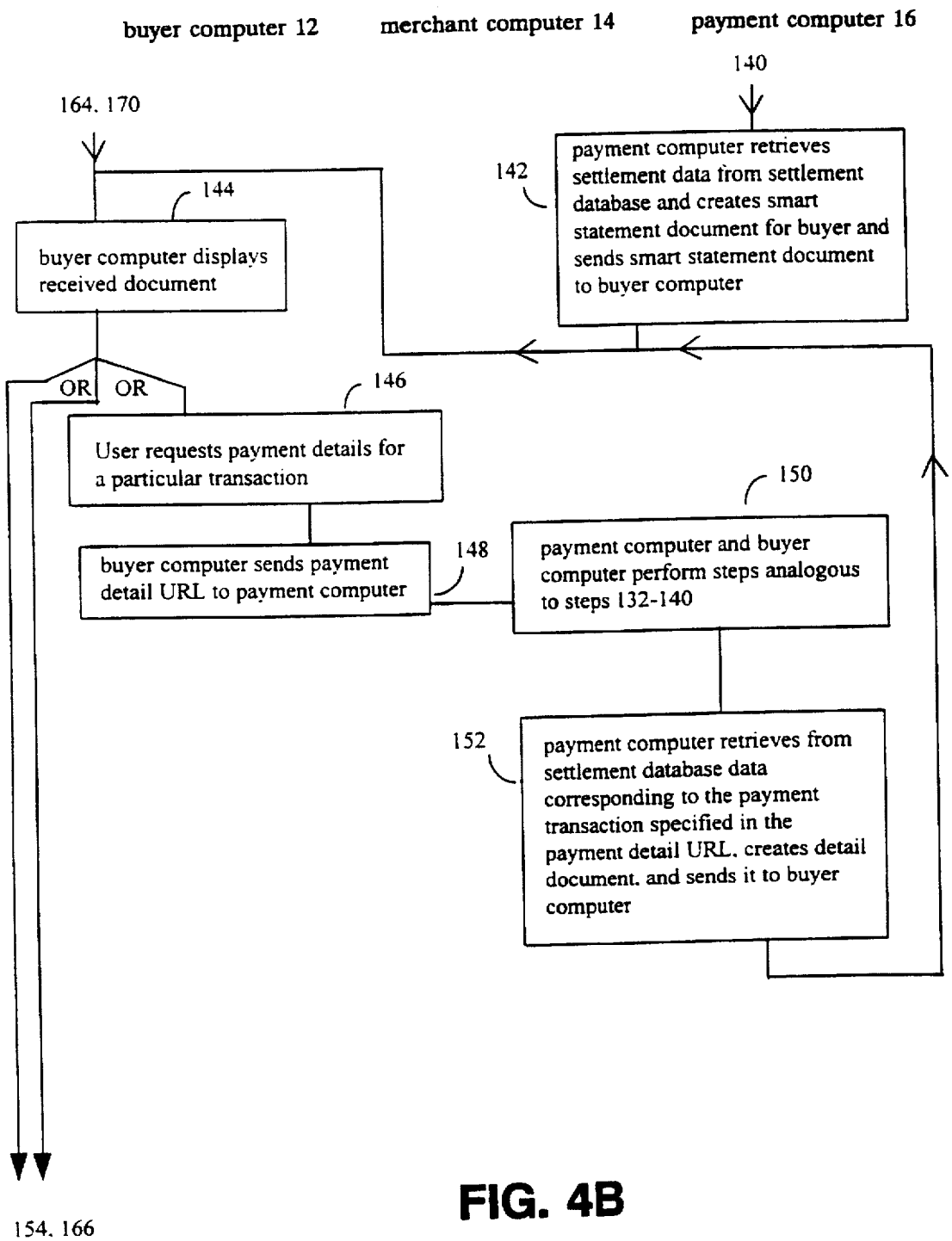
Figure 4C:
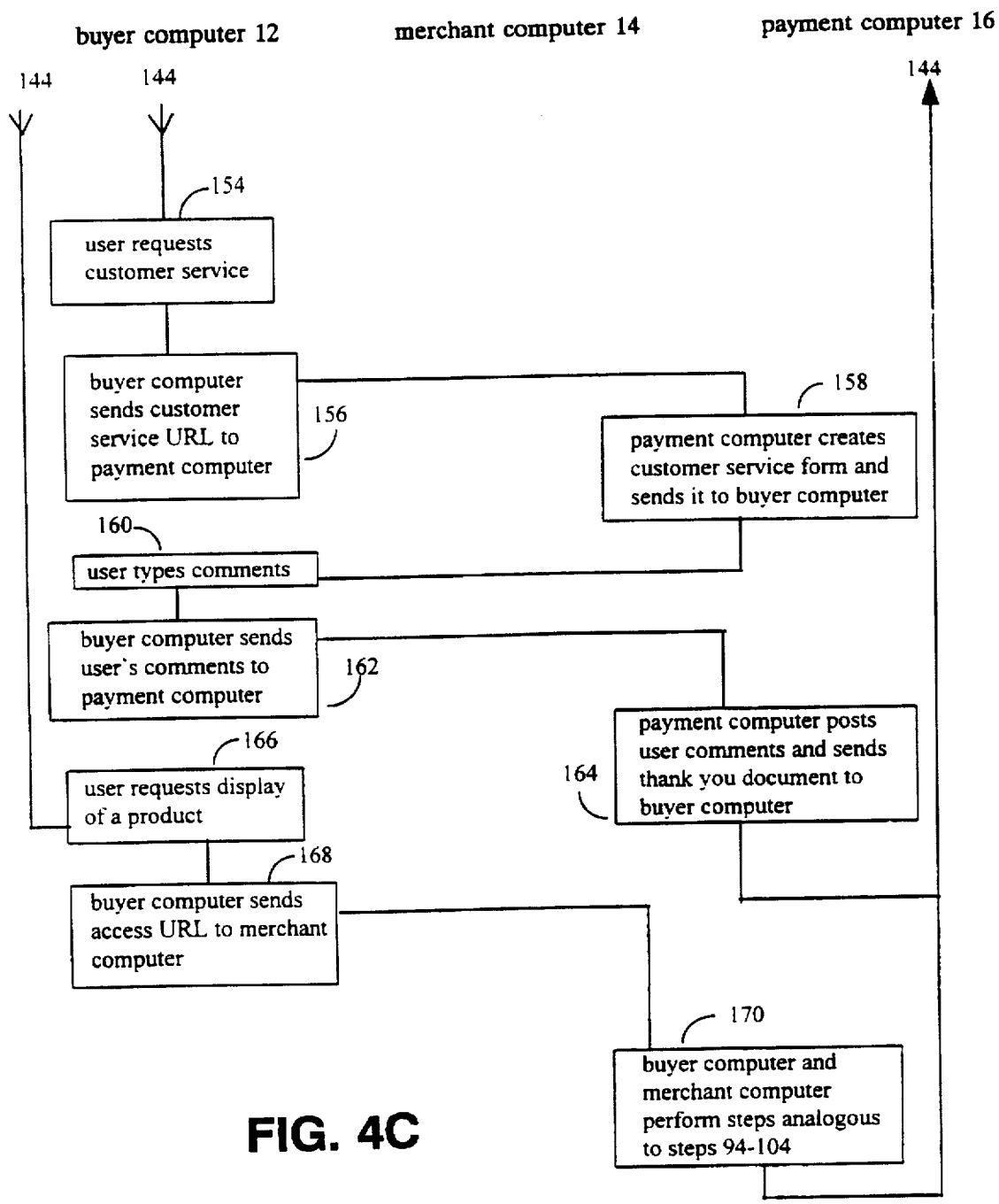

With reference now to FIG. 4, a user can request display of a "smart statement" that lists purchase transactions for a given month (step 128). When the buyer computer receives such a request, it sends a smart statement URL to the payment computer (step 130).

When the payment computer receives the smart statement URL, it verifies whether the smart statement URL authenticator was created from the contents of the smart statement URL using a cryptographic key (step 132). If not, the payment computer sends a document to the buyer computer indicating that access is denied (step 134). Otherwise, the payment computer checks to determine whether the buyer network address in the smart statement URL matches the buyer computer's actual network address (step 136). If not, the payment computer sends a document to the buyer computer indicating that access is denied (step 138). Otherwise (step 140), the payment computer and buyer computer perform a set of steps analogous to steps 64–81 in FIG. 2 (payment computer requests account name and password, user provides the requested information, and payment computer verifies the information).

In an alternative embodiment steps 132–138 are omitted.

After verification of account information is complete, the payment computer retrieves the requested settlement data from the settlement database, creates a smart statement document for the buyer, and sends the smart statement document to the buyer computer (step 142). An example of a smart statement document is shown in FIG. 11. Each purchase transaction record in the smart statement document includes the data of the transaction, the name of the merchant, an identification of the product, and the payment amount for the product. The smart statement document also includes a transaction detail URL for each purchase transaction (these URLs, or hypertext links, are discussed below and are not shown in FIG. 11). The smart statement document also identifies previous statements that the user may wish to have displayed.

The buyer computer displays the retrieved document (step 144), and the user may request transaction details for a particular transaction listed on the smart statement (step 146). If so, the buyer computer sends a transaction detail URL (or "payment detail URL") to the payment computer (step 148). The transaction detail URL includes a transaction identifier, a buyer network address, and a transaction detail URL authenticator. When the payment computer receives the transaction detail URL, it performs (step 150) a set of steps analogous to steps 132–140 (verification of URL authenticator, buyer network address, and account information). The payment computer then retrieves from the settlement database data corresponding to the payment transaction specified in the transaction detail URL, creates a transaction detail document, and sends it to the buyer computer (step 152).

Figure 12:
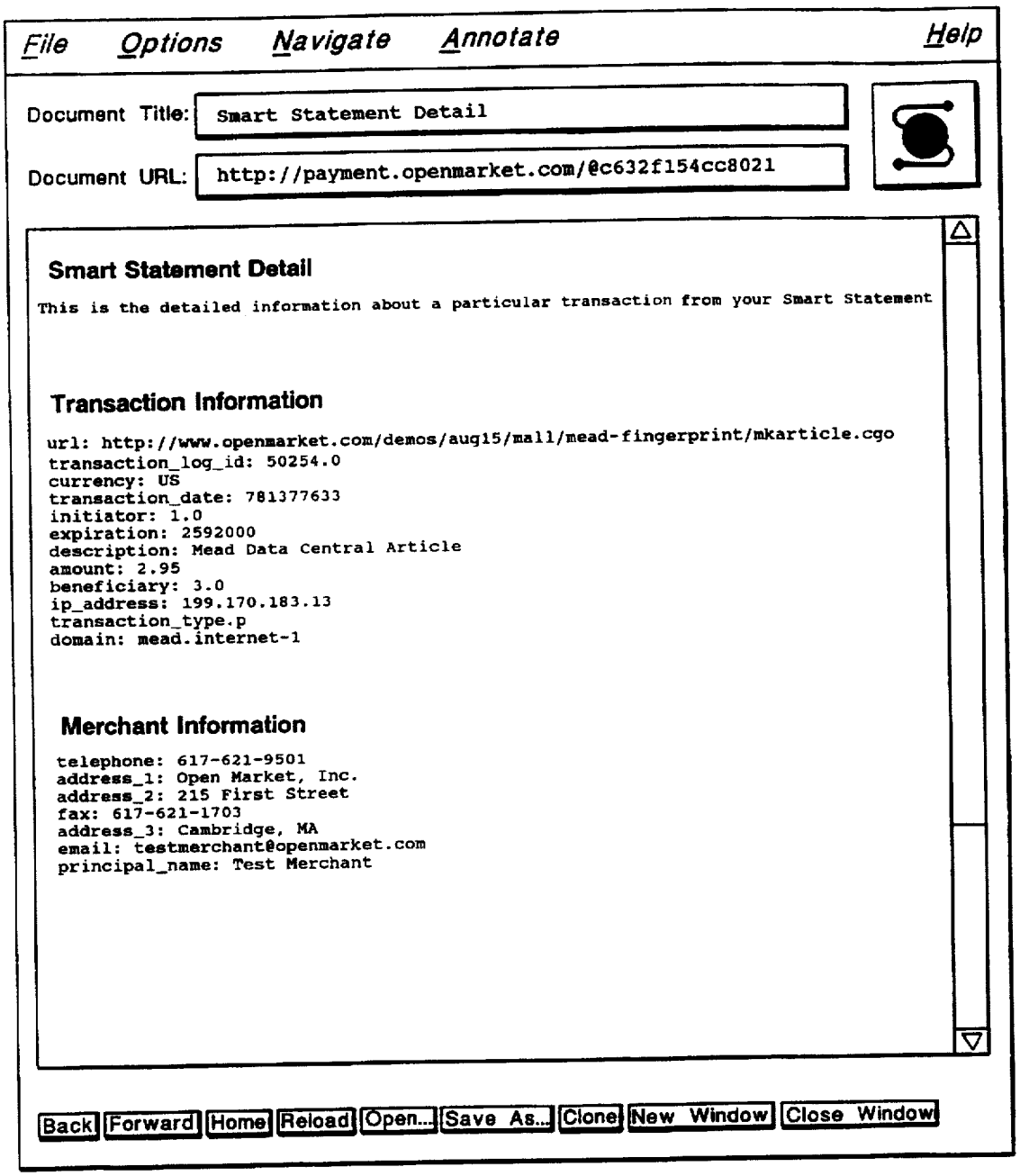
FIGS. 12 and 13 are screen snapshots of a transaction detail document that the payment computer sends to the buyer computer in FIG. 4.
Figure 13:
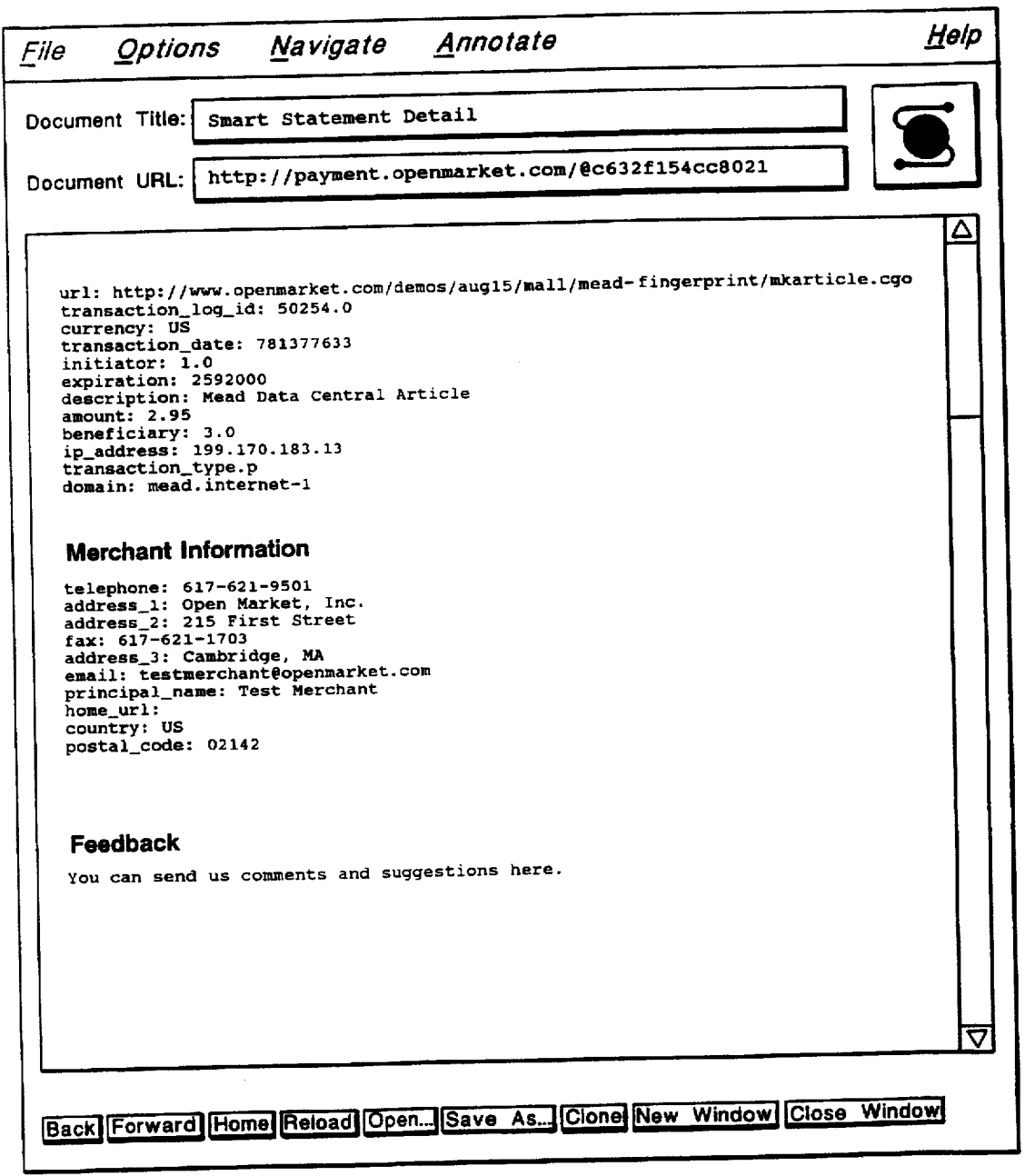

An example of a transaction detail document is shown in FIGS. 12 and 13. The document displays a number of items of information about the transaction, including the transaction date, end of the duration time ("expiration"), a description of the product, the payment amount, the domain corresponding to the product, an identification of the merchant, and the merchant's address.

Figure 14:
FIG. 14 is a screen snapshot of a customer service form that the payment computer sends to the buyer computer in FIG. 4.

The smart statement document and the transaction detail document both include customer service URLs (hypertext links) that allow the user to request customer service (i.e., to send comments and suggestions to the payment computer). When the user requests customer service (step 154), the buyer computer sends the customer service URL to the payment computer (step 156), which creates a customer service form and sends it to the buyer computer (step 158). An example of a customer service form is shown in FIG. 14. The user types comments into the customer service form (step 160), and the buyer computer sends the user's comments to the payment computer (step 162). The payment computer then posts the user comments and sends a thank you document to the buyer computer (step 164).

A user may request display of a product included in the smart statement. When the user requests that the product be displayed (step 166), the buyer computer sends the access URL contained in the smart statement document to the merchant computer (step 168), and the buyer computer and merchant computer perform a set of steps analogous to steps 94–104 in FIG. 2 (authentication of access URL, verification whether duration time has expired, verification of buyer network address, and transmission of fulfillment document to buyer computer).

Whenever the present application states that one computer sends a URL to another computer, it should be understood that in preferred embodiments the URL is sent in a standard HTTP request message, unless a URL message is specified as a redirection in the present application. The request message includes components of the URL as described by the standard HTTP protocol definition. These URL components in the request message allow the server to provide a response appropriate to the URL. The term "URL" as used the present application is an example of a "link," which is a pointer to another document or form (including multimedia documents, hypertext documents including other links, or audio/video documents).

When the present application states that one computer sends a document to another computer, it should be understood that in preferred embodiments the document is a success HTTP response message with the document in the body of the message. When the present application states that a server sends an account name and password request message to the client, it should be understood that in preferred embodiments the account name and password request message is an unauthorized HTTP response. A client computer sends account name and password information to a server as part of a request message with an authorization field.

The software architecture underlying the particular preferred embodiment is based upon the hypertext conventions of the World Wide Web. Appendix A describes the Hypertext Markup Language (HTML) document format used to represent digital advertisements. Appendix B describes the HTML forms fill out support in Mosaic 2.0. Appendix C is a description of the Hypertext Transfer Protocol (HTTP) between buyer and merchant computers. Appendix D describes how documents are named with Uniform Resource Locators (URLs) in the network of computers, and Appendix E describes the authentication of URLs using digital signatures.

A printout of a computer program for use in creating and operating such a "store" in accordance with the present invention is provided as Appendix F. A printout of a computer program for use in operating other aspects of the network sales system in accordance with the present invention is provided in the microfiche appendix G.

There has been described a new and useful network-based sales system. It is apparent that those skilled in the art may make numerous modifications and departures from the specific embodiments described herein without departing from the spirit and scope of the claimed invention.

What is claimed is:

1. A network-based sales system, comprising:
   at least one buyer computer for operation by a user desiring to buy a product;
   at least one merchant computer; and
   at least one payment computer;
   said buyer computer, said merchant computer, and said payment computer being interconnected by a computer network;
   said buyer computer being programmed to receive a user request for purchasing a product, and to cause a payment message to be sent to said payment computer that comprises a product identifier identifying said product;
   said payment computer being programmed to receive said payment message, to cause an access message to be created that comprises said product identifier and an access message authenticator based on a cryptographic key, and to cause said access message to be sent to said merchant computer; and
   said merchant computer being programmed to receive said access message, to verify said access message authenticator to ensure that said access message authenticator was created using said cryptographic key, and to cause said product to be sent to said user desiring to buy said product.

2. A network-based sales system in accordance with claim 1, wherein said payment message and said access message each comprises a universal resource locator.

3. A network-based sales system in accordance with claim 1, wherein said payment computer is programmed to identify said merchant computer upon receipt of said payment message from said buyer computer.

4. A network-based sales system in accordance with claim 1, wherein said access message comprises a buyer network address.

5. A network-based sales system in accordance with claim 4, wherein:
said product can be transmitted from one computer to another; and
said merchant computer causes said product to be sent to said user by transmitting said product to said buyer network address only.

6. A network-based sales system in accordance with claim 4, wherein said merchant computer is programmed to verify whether said buyer network address in said access message matches the actual network address of said buyer computer.

7. A network-based sales system in accordance with claim 1, wherein said payment message comprises a buyer network address.

8. A network-based sales system in accordance with claim 7, wherein said payment computer is programmed to verify whether said buyer network address in said payment message matches the actual network address of said buyer computer.

9. A network-based sales system in accordance with claim 1, wherein said access message authenticator comprises a cryptographic function of contents of said access message based on said cryptographic key.

10. A network-based sales system in accordance with claim 1, wherein said payment computer is programmed to verify said payment message authenticator to ensure that said payment message authenticator was created using said cryptographic key.

11. A network-based sales system in accordance with claim 10, wherein said payment message authenticator comprises a cryptographic function of contents of said payment message based on said cryptographic key.

12. A network-based sales system in accordance with claim 1, wherein said payment message comprises a payment amount.

13. A network-based sales system in accordance with claim 1, wherein said payment message comprises a merchant account identifier that identifies a merchant account.

14. A network-based sales system in accordance with claim 1, wherein said buyer computer is programmed to transmit a user account identifier to said payment computer that identifies a user account.

15. A network-based sales system in accordance with claim 14, wherein:
said payment message comprises a payment amount; and
said payment computer is programmed to ensure that said user account has sufficient funds or credit to cover said payment amount.

16. A network-based sales system in accordance with claim 14, wherein:
said payment message comprises a payment amount and a merchant account identifier that identifies a merchant account; and
said payment computer is programmed to record said payment amount, said user account, and said merchant account in a settlement database.

17. A network-based sales system in accordance with claim 16, wherein:
said payment message comprises a domain identifier; and
said payment computer is programmed to record said domain identifier and said user account in a settlement database.

18. A network-based sales system in accordance with claim 17, wherein said payment computer is programmed to check said settlement database, upon receipt of said payment message, to determine whether said user account has previously purchased a product associated with said domain identifier.

19. A network-based sales system in accordance with claim 18, wherein said payment computer is programmed to determine an actual payment amount for said product identified by said product identifier in said payment message based on whether said user account has previously purchased a product associated with said domain identifier.

20. A network-based sales system in accordance with claim 1, wherein said buyer computer is programmed to transmit a user authenticator to said payment computer and said payment computer is programmed to verify said user authenticator.

21. A network-based sales system in accordance with claim 20, wherein said user authenticator comprises a password.

22. A network-based sales system in accordance with claim 20, wherein:
said buyer computer is programmed to transmit security information to said payment computer;
said payment computer is programmed to transmit a challenge form to said buyer computer under a predetermined condition, said challenge form asking for said security information previously transmitted by said buyer computer to said payment computer;
said payment computer is programmed to respond to said challenge form by querying said user for said security information and transmitting said security information to said payment computer; and
said payment computer is programmed to verify authenticity of said security information.

23. A network-based sales system in accordance with claim 22, wherein:
said payment message comprises a payment amount; and
said predetermined condition comprises receipt of a payment amount in said payment message that exceeds a threshold.

24. A network-based sales system in accordance with claim 1, wherein said payment message comprises a merchant computer identifier that identifies said merchant computer.

25. A network-based sales system in accordance with claim 24, wherein said access message comprises said merchant computer identifier.

26. A network-based sales system in accordance with claim 1, wherein said payment message comprises a duration time that specifies a length of time for which access to said product is to be granted.

27. A network-based sales system in accordance with claim 26, wherein said payment computer is programmed to use said duration time to compute an end of duration time and to cause said end of duration time to be included in said access message.

28. A network-based sales system in accordance with claim 27, wherein said merchant computer is programmed to verify, upon receipt of said access message, that said end of duration time has not past.

29. A network-based sales system in accordance with claim 1, wherein said payment message comprises an expiration time after which said payment message can no longer be used.

30. A network-based sales system in accordance with claim 29, wherein said payment computer is programmed to verify, upon receipt of said payment message, that said expiration time has not past.

31. A network-based sales system in accordance with claim 1, wherein:
said payment computer is programmed to cause said access message to be sent to said buyer computer; and said buyer computer is programmed to cause said access message received from said payment computer to be sent to said merchant computer.

32. A network-based sales system, comprising:

at least one buyer computer for operation by a user desiring to buy a product;

at least one merchant computer; and at least one payment computer;

said buyer computer, said merchant computer, and said payment computer being interconnected by a computer network;

said buyer computer being programmed to receive a user request for purchasing a product, and to cause a payment URL to be sent to said payment computer that comprises a product identifier identifying said product, a payment amount, and a payment URL authenticator comprising a cryptographic function of contents of said payment URL based on a cryptographic key;

said payment computer being programmed to receive said payment URL, to verify said payment URL authenticator to ensure that said payment URL authenticator was created using said cryptographic key, to ensure that said user has sufficient funds or credit to cover said payment amount, to identify said merchant computer operated by said merchant willing to sell said product to said buyer, to cause an access URL to be created that comprises said product identifier and an access URL authenticator comprising a cryptographic function of contents of said access URL based on a cryptographic key, and to cause said access URL to be sent to said buyer computer;

said buyer computer being programmed to cause said access URL received from said payment computer to be sent to said merchant computer; and said merchant computer being programmed to receive said access URL, to verify said access URL authenticator to ensure that said access URL authenticator was created using said cryptographic key, and to cause said product to be sent to said user desiring to buy said product.

33. A method of operating a payment computer in a computer network comprising at least one buyer computer for operation by a user desiring to buy a product, at least one merchant computer, and at least one payment computer, the method comprising the steps of:

receiving, at said payment computer, a payment message that said buyer computer has caused to be sent to said payment computer in response to a user request for purchasing a product, said payment message comprising a product identifier identifying said product;

causing an access message to be created that comprises said product identifier and an access message authenticator based on a cryptographic key; and causing said access message to be sent to said merchant computer, said merchant computer being programmed to receive said access message, to verify said access message authenticator to ensure that said access message authenticator was created using said cryptographic key, and to cause said product to be sent to said user desiring to buy said product.

34. A network-based sales system, comprising:

at least one buyer computer for operation by a user desiring to buy products;

at least one shopping cart computer; and a shopping cart database connected to said shopping cart computer;

said buyer computer and said shopping cart computer being interconnected by a computer network;

said buyer computer being programmed to receive a plurality of requests from a user to add a plurality of respective products to a shopping cart in said shopping cart database, and, in response to said requests to add said products, to send a plurality of respective shopping cart messages to said shopping cart computer each of which comprises a product identifier identifying one of said plurality of products;

said shopping cart computer being programmed to receive said plurality of shopping cart messages, to modify said shopping cart in said shopping cart database to reflect said plurality of requests to add said plurality of products to said shopping cart, and to cause a payment message associated with said shopping cart to be created; and said buyer computer being programmed to receive a request from said user to purchase said plurality of products added to said shopping cart and to cause said payment message to be activated to initiate a payment transaction for said plurality of products added to said shopping cart;

said shopping cart being a stored representation of a collection of products, said shopping cart database being a database of stored representations of collections of products, and said shopping cart computer being a computer that modifies said stored representations of collections of products in said database.

35. A network-based sales system in accordance with claim 34, wherein said shopping cart computer is programmed to cause said payment message to be created before said buyer computer causes said payment message to be activated.

36. A network-based sales system in accordance with claim 34, wherein said buyer computer is programmed to receive a request from said user to display said plurality of products added to said shopping cart.

37. A network-based sales system in accordance with claim 36, wherein said buyer computer is programmed to transmit a fetch shopping cart request to said payment computer in response to receipt of said request from said user.

38. A network-based sales system in accordance with claim 37, wherein:

said payment computer is programmed to respond to said fetch shopping cart request by transmitting a message to said buyer computer indicating said plurality of products added to said shopping cart; and said buyer computer is programmed to display said plurality of products added to said shopping cart.

39. A method of operating a shopping cart computer in a computer network comprising at least one buyer computer for operation by a user desiring to buy products, at least one shopping cart computer, and a shopping cart database connected to said shopping cart computer, said method comprising the steps of:

receiving, at said shopping cart computer, a plurality of shopping cart messages sent to said shopping cart computer by said buyer computer in response to receipt of a plurality of requests from a user to add a plurality of respective products to a shopping cart in said shopping cart database, each of said shopping cart messages comprising a product identifier identifying one of said plurality of products;

modifying said shopping cart in said shopping cart database to reflect said plurality of requests to add said plurality of products to said shopping cart; and causing a payment message associated with said shopping cart to be created;

said buyer computer being programmed to receive a request from said user to purchase said plurality of products added to said shopping cart and to cause said payment message to be activated to initiate a payment transaction for said plurality of products added to said shopping cart;

said shopping cart being a stored representation of a collection of products, said shopping cart database being a database of stored representations of collections of products, and said shopping cart computer being a computer that modifies said stored representations of collections of products in said database.

40. A network-based link message system, comprising:

at least one client computer for operation by a client user; and at least one server computer for operation by a server user;

said client computer and said server computer being interconnected by a computer network;

said client computer being programmed to send an initial link message to said server computer;

said server computer being programmed to receive said initial link message from said client computer, to create, based on information contained in said initial link message, a session link message that encodes a state of interaction between said client computer and said server computer, said session link message comprising a session link authenticator, computed by a cryptographic function of said session link contents, for authenticating said session link message, and to cause said session link message to be sent to said client computer;

said client computer being programmed to cause said session link message to be sent to a computer in said network that is programmed to authenticate said session link message by examining said session link authenticator and that is programmed to respond to said session link message based on said state of said interaction between said client computer and said server computer.

41. A network-based link message system in accordance with claim 40, wherein:

said client computer comprises a buyer computer for operation by a user desiring to buy a product;

said server computer comprises a payment computer for operation by a manager of said network-based link message system; and said network-based link message system further comprises a merchant computer for operation by a merchant willing to sell said product to said buyer.

42. A network-based link message system in accordance with claim 41, wherein said computer that is programmed to authenticate said session link message comprises said merchant computer.

43. A network-based link message system in accordance with claim 41, wherein said initial link message comprises a payment message to said payment computer that comprises a product identifier identifying said product.

44. A network-based link message system in accordance with claim 43, wherein said session link message comprises an access message that comprises said product identifier to be created.

45. A network-based link message system in accordance with claim 44, wherein said merchant computer is programmed to respond to said access message by causing said product to be sent to said user desiring to buy said product.

46. A network-based link message system in accordance with claim 40, wherein said initial link message and said session link message comprise universal resource locators.

47. A network-based link message system in accordance with claim 40, wherein:

said session link authenticator comprises a cryptographic function of contents of said session link message based on a cryptographic key; and said computer to which said client computer is programmed to cause said session link message to be sent is programmed to verify that said session link authenticator was created using said cryptographic key.

48. A method of operating a server computer in a network-based link message system comprising at least one client computer for operation by a client user and at least one server computer for operation by a server user, said client computer and said server computer being interconnected by a computer network, said method comprising the steps of:

receiving, at said server computer, an initial link message sent to said server computer by said client computer;

creating, based on information contained in said initial link message, a session link message that encodes a state of interaction between said client computer and said server computer, said session link message comprising a session link authenticator, computed by a cryptographic function of said session link contents, for authenticating said session link message; and causing said session link message to be sent to said client computer;

said client computer being programmed to cause said session link message to be sent to a computer in said network that is programmed to authenticate said session link message by examining said session link authenticator and that is programmed to respond to said session link message based on said state of said interaction between said client computer and said server computer.

* * * * *

UNITED STATES PATENT AND TRADEMARK OFFICE
Certificate

Patent No. 5,715,314                                         Patented: February 3, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Andrew C. Payne, Lincoln, MA; Lawrence C. Stewart, Burlington, MA; and G. Winfield Treese, Wayland, MA.

Signed and Sealed this Sixth Day of April 2004.

THOMAS H. TARCZA
*Supervisory Patent Examiner*
Art Unit 3662

EX PARTE REEXAMINATION CERTIFICATE (5932nd)

United States Patent
Payne et al.

(10) Number: US 5,715,314 C1
(45) Certificate Issued: *Oct. 9, 2007

(54) NETWORK SALES SYSTEM

(75) Inventors: Andrew C. Payne, Lincoln, MA (US); Lawrence C. Stewart, Burlington, MA (US); G. Winfield Treese, Wayland, MA (US)

(73) Assignee: Soverain Software LLC, Chicago, IL (US)

Reexamination Request:
No. 90/007,287, Nov. 3, 2004

Reexamination Certificate for:
Patent No.: 5,715,314
Issued: Feb. 3, 1998
Appl. No.: 08/328,133
Filed: Oct. 24, 1994

(*) Notice: This patent is subject to a terminal disclaimer.

Certificate of Correction issued Apr. 6, 2004.

(51) Int. Cl.
G06Q 30/00 (2006.01)
G06Q 10/00 (2006.01)
G06Q 20/00 (2006.01)
G07F 7/00 (2006.01)

(52) U.S. Cl. .............................. 705/78; 705/26; 705/75; 713/162

(58) Field of Classification Search .................... None
See application file for complete search history.

(56) References Cited

U.S. PATENT DOCUMENTS

| | | | |
|---|---|---|---|
| 4,484,304 A | 11/1984 | Anderson et al. | |
| 4,528,643 A | 7/1985 | Freeny, Jr. | |
| 4,529,870 A | 7/1985 | Chaum | |
| 4,566,078 A | 1/1986 | Crabtree | |
| 4,759,063 A | 7/1988 | Chaum | |
| 4,759,064 A | 7/1988 | Chaum | |
| 4,891,503 A | 1/1990 | Jewell | |
| 4,926,480 A | 5/1990 | Chaum | |
| 4,941,089 A | 7/1990 | Fischer | |
| 4,947,430 A | 8/1990 | Chaum | |

(Continued)

FOREIGN PATENT DOCUMENTS

| | | |
|---|---|---|
| EP | 0172 670 | 2/1986 |
| EP | 0456920 | 11/1991 |
| EP | 0645688 | 3/1995 |
| JP | 3278230 | 12/1991 |
| JP | 4-10191 | 1/1992 |

(Continued)

OTHER PUBLICATIONS

Trewitt, Glenn, *Using Tcl to Process HTML Forms*, Digital Equipment Corporation Network Systems Laboratory TN–14, dated Mar. 1994.

(Continued)

*Primary Examiner*—Michael O'Neill

(57) ABSTRACT

A network-based sales system includes at least one buyer computer for operation by a user desiring to buy a product, at least one merchant computer, and at least one payment computer. The buyer computer, the merchant computer, and the payment computer are interconnected by a computer network. The buyer computer is programmed to receive a user request for purchasing a product, and to cause a payment message to be sent to the payment computer that comprises a product identifier identifying the product. The payment computer is programmed to receive the payment message, to cause an access message to be created that comprises the product identifier and an access message authenticator based on a cryptographic key, and to cause the access message to be sent to the merchant computer. The merchant computer is programmed to receive the access message, to verify the access message authenticator to ensure that the access message authenticator was created using the cryptographic key, and to cause the product to be sent to the user desiring to buy the product.

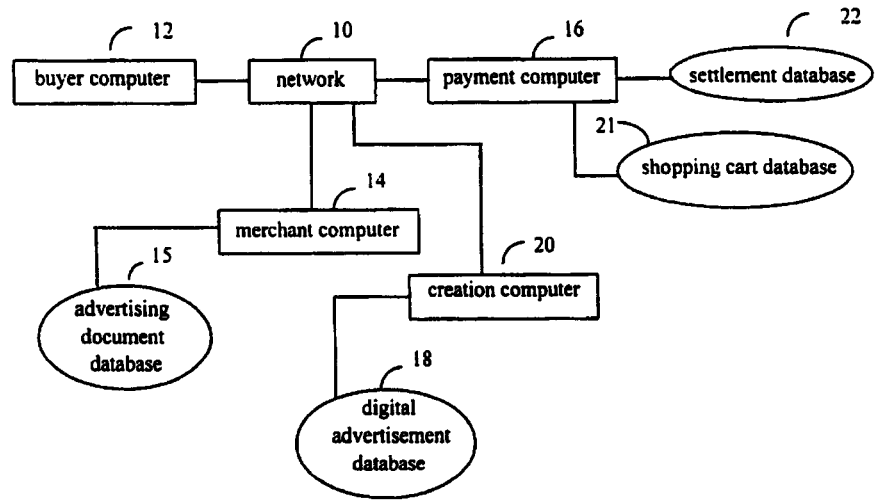

U.S. PATENT DOCUMENTS

| | | |
|---|---|---|
| 4,949,380 A | 8/1990 | Chaum |
| 4,972,318 A | 11/1990 | Brown et al. |
| 4,987,593 A | 1/1991 | Chaum |
| 4,991,210 A | 2/1991 | Chaum |
| 4,996,711 A | 2/1991 | Chaum |
| 5,035,515 A | 7/1991 | Crossman et al. |
| 5,105,184 A | 4/1992 | Pirani et al. |
| 5,204,947 A | 4/1993 | Bernstein et al. |
| 5,276,736 A | 1/1994 | Chaum |
| 5,297,249 A | 3/1994 | Bernstein et al. |
| 5,309,437 A | 5/1994 | Perlman et al. |
| 5,311,594 A | 5/1994 | Penzias |
| 5,319,542 A | 6/1994 | King, Jr. et al. |
| 5,321,751 A | 6/1994 | Ray et al. |
| 5,325,362 A | 6/1994 | Aziz |
| 5,347,632 A | 9/1994 | Filepp et al. ............... 395/200 |
| 5,353,283 A | 10/1994 | Tsuchiya |
| 5,388,257 A | 2/1995 | Bauer |
| 5,457,738 A | 10/1995 | Sylvan |
| 5,475,585 A | 12/1995 | Bush |
| 5,483,652 A | 1/1996 | Sudama et al. |
| 5,491,820 A | 2/1996 | Belove et al. |
| 5,521,631 A | 5/1996 | Budow et al. |
| 5,530,852 A | 6/1996 | Meske, Jr. et al. |
| 5,535,229 A | 7/1996 | Hain, Jr. et al. |
| 5,544,320 A | 8/1996 | Konrad |
| 5,544,322 A | 8/1996 | Cheng et al. |
| 5,550,984 A | 8/1996 | Gelb |
| 5,557,516 A | 9/1996 | Hogan |
| 5,557,518 A | 9/1996 | Rosen |
| 5,557,798 A | 9/1996 | Skeen et al. |
| 5,560,008 A | 9/1996 | Johnson et al. |
| 5,577,209 A | 11/1996 | Boyle et al. |
| 5,583,996 A | 12/1996 | Tsuchiya |
| 5,590,197 A | 12/1996 | Chen et al. |
| 5,592,378 A | 1/1997 | Cameron et al. ........... 395/227 |
| 5,594,910 A | 1/1997 | Filepp et al. |
| 5,596,642 A | 1/1997 | Davis et al. |
| 5,596,643 A | 1/1997 | Davis et al. |
| 5,604,802 A | 2/1997 | Holloway |
| 5,619,648 A | 4/1997 | Canale et al. |
| 5,621,797 A | 4/1997 | Rosen |
| 5,623,547 A | 4/1997 | Jones et al. |
| 5,623,656 A | 4/1997 | Lyons |
| 5,642,419 A | 6/1997 | Rosen |
| 5,664,110 A | 9/1997 | Green et al. |
| 5,664,111 A | 9/1997 | Nahan et al. |
| 5,675,507 A | 10/1997 | Bobo, II |
| 5,694,551 A | 12/1997 | Doyle et al. |
| 5,708,780 A | 1/1998 | Levergood et al. |
| 5,710,884 A | 1/1998 | Dedrick |
| 5,724,424 A | 3/1998 | Gifford |
| 5,724,521 A | 3/1998 | Dedrick |
| 5,727,164 A | 3/1998 | Kaye et al. |
| 5,732,219 A | 3/1998 | Blummer et al. |
| 5,734,719 A | 3/1998 | Tsevdos et al. |
| 5,761,662 A | 6/1998 | Dasan |
| 5,768,142 A | 6/1998 | Jacobs |
| 5,768,521 A | 6/1998 | Dedrick |
| 5,774,670 A | 6/1998 | Montulli |
| 5,784,565 A | 7/1998 | Lewine |
| 5,790,793 A | 8/1998 | Higley |
| 5,806,077 A | 9/1998 | Wecker |
| 5,812,776 A | 9/1998 | Gifford |
| 5,826,241 A | 10/1998 | Stein et al. |
| 5,826,242 A | 10/1998 | Montulli |
| 5,848,399 A | 12/1998 | Burke ........................ 705/27 |
| 5,848,413 A | 12/1998 | Wolff |
| 5,870,552 A | 2/1999 | Dozier et al. |
| 5,895,454 A | 4/1999 | Harrington |
| 5,897,622 A | 4/1999 | Blinn et al. |
| 5,909,492 A * | 6/1999 | Payne et al. .................. 705/78 |
| 5,920,847 A | 7/1999 | Kolling et al. |
| 5,982,891 A | 11/1999 | Ginter et al. |
| 6,006,199 A | 12/1999 | Berlin et al. |
| 6,023,683 A | 2/2000 | Johnson et al. |
| 6,041,316 A | 3/2000 | Allen |
| 6,049,785 A | 4/2000 | Gifford |
| 6,134,592 A | 10/2000 | Montulli |
| 6,195,649 B1 | 2/2001 | Gifford |
| 6,199,051 B1 | 3/2001 | Gifford |
| 6,205,437 B1 | 3/2001 | Gifford |
| 6,449,599 B1 | 9/2002 | Payne et al. |
| 6,708,157 B2 | 3/2004 | Stefik et al. |

FOREIGN PATENT DOCUMENTS

| | | |
|---|---|---|
| JP | 05-158963 | 6/1993 |
| JP | 5274275 | 10/1993 |
| JP | 6162059 | 6/1994 |
| JP | 6291776 | 10/1994 |
| WO | WO 93/10503 | 5/1993 |
| WO | WO 94/03859 | 2/1994 |

OTHER PUBLICATIONS

Viescas, John L., The Official Guide to the Prodigy Service, Microsoft Press, 1991, ISBN 1–55615–374–0.

BizNet Technologies, Versatile Virtual Vending, published at http://www.bnt.com, Sep. 12, 1994.

Amazon "Welcome First Time Visitors" Jun. 1998 pp. 1–4.

"CompuServe Videotex Network Offers Marketing Research Service, ad Test", Marketing News, Nov. 25, 1993, p. 21.

"Electronic In–Home Shopping: 'Our Stores are Always Open'," Chain Store Age Executive, Mar. 1985, pp. 111, 116.

"Mall Offers a Holiday Treat for Hackers," Advertising Age, Nov. 13, 1985, p. 76.

"Suddenly, VideoTex is Finding an Audience", Business Week, Oct. 19, 1987, pp. 92–94.

"Redcoats Join Communications Fight", Industry Week, Feb. 22, 1982, pp. 108–109.

"Taking Advantage of the Past",Advertising Age, Apr. 11, 1983, pp. M36–37.

Beutelspacher et al., "Payment Applications with Multifunctional Smart Cards", Smart Card 2000, 1989, pp. 95–101.

Booz, Allen & Hamilton, "How to Buy Information with a First Virtual Account", Apr. 11, 1994, 63 pages.

Burk et al., "Digital Payment Systems Enabling Security and Unobservability", Computers & Security, 1989, pp. 399–415.

Computer Shopper, "Internet for Profit", Nov. 1994, pp. 180–182; 190–192; 522–528, 532, 534.

"Consumers Plugging into New Electronic Mail", Adversiting Age, Mar. 4, 1985, p. 74.

Damgard, "Payment Systems and Credential Mechanisms with Provable Security Against Abuse by Individuals", Advances in Cryptology—CRYPTO '88, 1988, pp. 328–335.

Davies et al., "Security for Computer Networks: An Introduction to Data Security In Teleprocessing and Electronic Funds Transfer", John Wiley & Sons, Dec. 5, 1985, pp. 304–336.

Ferrarini, E., "Direct Connections for Software Selections", Business Computer Systems, Feb. 1985, pp. 35–38.

Fujioka, et al., "ESIGN: An Efficient Digital Signature Implementation for Smart Cards," Advances in Cryptology—Eurocrypt '91, Apr. 1991, pp. 446–457.

Hakota., et al., A System for Automatic Value Exchange Exchange, Proceedings—Fall Joint Computer Conference, Nov. 1966, pp. 579–589.

Hirschfeld, "Making Electronic Refunds Safer", Laboratory for Computer Science, MIT, 1992, 4 pages.

Jansson, L., "General Electronic Payment System", 7th Proceedings of the International Conference on Computer Communication, 1985, pp. 832–835.

Kenny, "EDI Security: Risks and Solutions", SD–Scion UK Limited,1992, 12 pages.

Knapskog, "Privacy Protected Payments—Reliazation of a Protocol that Guarantees Payer Anonymity", EuroCrypt 1988, pp. 107–121.

Lai et al., "Endorsements, Licensing, and Insurance for Distributed System Services", Information Sciences Institute, U. of Southern California, undated, 6 pages.

Low et al., "Anonymous Credit Cards", undated, pp. 1–16.

Messmer, "NIST Stumbles on Proposal for Public–Key Encryption", Network World, Jul. 27, 1992, pp. 1–6.

Perry, "Electronic Banking Goes to Market", IEEE Spectrum, Feb. 1988, pp. 46–49.

Ph. van Heurck, "TRASEC: Belgian Security Systems for Electronic Funds Transfers," Computers & Security, 1987, pp. 261–268.

Pongratz, et al., "IC Cards in Videotex Systems", Smart Card 2000, 1989, pp. 179–186, 1 page.

Recommendation X.509: The Directory—Authentication Framework, Fascicle VIII.8 (Melbourne 1988) pp. 48–82.

Remery, P., et al., "Le paiement electronique", L'Echo des Recherches, No. 134, 1988, pp. 15–23.

Rescorla E., et al., "The Secure HyperText Transfer Protocol", Enterprise Integration Technologies, Dec. 1994, 35 pages.

Shain, "Security in Electronic Funds Transfer: Message Integrity in Money Transfer and Bond Settlements through GE Information Services' Global Network", Computers & Security, vol. 8, No. 3 1989, pp. 209–221.

Staskauskas, "The Formal Specification and Design of a Distributed Electronic Funds–Transfer System", *EEE, 1988, pp. 1515–1528.

Stol, "Privacy Protected Payments—A Possible Structure for a Real Implementation and Some Resource Considerations", Reproduced by U.S. Department of Commerce, 83 pages.

Strazewski, "Computerized Service Sets Shoppers Hacking", Advertising Age, Feb. 33, 1988, p. 62.

Takei, Videotex Information System and Credit System Connecting with MARS 301–of JNR, Japanese Railway Engineering, No. 95, Sep. 1985, pp. 9–11.

Tanaka et al., "Untraceable Electronic Funds Transfer Systems", Electronics and Communications in Japan, Part 3, vol. 72, No. 9, 1989, pp. 47–54.

Tunstall, "Electronic Currency", Smart Card 2000: The Future of IC Cards, Oct. 1987, pp. 47–48.

Waidner, et al., "Loss–Tolerance for Electronics Wallets", Fault–Tolerant Computing: 20th International Symposium, Jun. 26–28, 1990, pp. 140–147.

Weber, "Controls in Electronic Funds Transfer Systems: A Survey and Synthesis", Computers & Security, 1989, pp. 123–137.

Williams, "Debit Program Cuts Fraud—CompuServe Plan a Success", Pensions & Investment Age, Feb. 4, 1985, pp. 31–33.

Joint Claim Construction Chart (Patent Local Rule 4–5D)), filed Dec. 27, 2004 with Appendix A.

Order Denying Amazon's Motion to Stay Proceedings Pending Completion of the Reexamination.

Transcript of the Markmam Hearing Before the Honorable Leonard David United States District Judge, Jan. 6, 2005.

Complaint for Patent Infringement filed Jan. 12, 2004.

Amazon.com's Answer, Affirmative Defenses, and Counterclaims to Soverain Software's Complaint filed Mar. 9, 2004.

Amazon.com's Response to Plaintiff's First Set of Interrogatories (Nos. 1–22) filed Jun. 11, 2004.

Soverain's Responses and Objections to Amazon.com's First Set of Interrogatories (Nos. 1–14) filed Jun. 11, 2004.

Disclosure of Preliminary Invalidity Contentions by Defendants Amazon.com and the Gap (with Exhibit A) filed Jul. 6, 2004.

Soverains'Supplemental Responses to Amazon.com's First Set of Interrogatories (Nos. 1–14) filed Aug. 13, 2004.

Soverain's Second Supplemental Response to Amazon.com's First Set of Interragotories (Nos. 1–14) filed Sep. 21, 2004.

Soverain's Third Supplemental Response to Amazon.com's First Set of Interrogatories (Nos. 1–14).

Soverain's Preliminary Claim Construction (Patent Local Rule 4–2) filed Sep. 2, 2004.

Joint Disclosure of Prelminary Claim Construction and Extrinsic Evidence by Defendants Amazon.com and the Gap (with Exhibits A–B) filed Sep. 2, 2004.

Joint Claim Construction and Prehearing Statement (Patent Local Rule 4–3) (with Exhibits A–D) filed Oct. 4, 2004.

Amazon.com's First Amended Answer, Affirmative Defenses, and Counterclaims to Soverain's Complaint filed Oct. 6, 2004.

Declaration of Jack D. Grimes Ph.D., dated Nov. 15, 2004.

Soverain's Claim Construction Brief Pursuant to Patent Rule 4–5(a) dated Nov. 16, 2004.

Declaration of Dr. Richard N. Taylor in Support of Defendants' Markman Brief dated Nov. 29, 2004.

Joint Claim Construction Brief of Amazon.com and Gap dated Nov. 30, 2004.

Soverain's Claim Construction Reply Brief Pusuant to Patent Rule 4–5(c) dated Dec. 7, 2004.

Bina, E., et al., "Secure Access to Data Over the Internet," 1994 IEEE, pp. 99–102.

Xiuchi, T., et al., "C–HTTP—The Development of a Secure, Closed HTTP–Based Network on the Internet," 1996 IEEE, pp. 64–75.

Berners–Lee, T., et al., "Target a Common Internet Syntax Where the User Password is Appended to a Specific URL," http://www.ietf.org/rfc/rfc1738.txt?number=1738.

57 USPQ2D, "*Amazon.com, Inc.* v. *Barnesandnoble.com, Inc.*" pp. 1746–1763.

Pitkow, J.E., "Webviz: A Tool for World–Wide Web Access Log Analysis." First International World Wide Web Conf., May 1994, 7 pgs.

Lim, Jong–Gyun, "Using Coollists to Index HTML Documents in the Web." http://www.ncsa.uiuc.edu/SDG/TT94/Proceedings/Searching/lim/coollist. htm, pp. 1–8.

Sedayao, J., "Mosiac Will Kill My Network!—Studying Network Traffic Patterns of Mosaic Use", http://www.ncsa.uiuc.edu/SDG/TT94/P...gs/DDay/sedayao/mos_traf_paper.htm.

Catledge, L.D., "Characterizing Browsing Strategies in the World–Wide Web," http:www.igd.thg.de/archive/1995_.../UserPatterns.Paper4.formatted.htm.

Menefee, C., "New host for Internet Commercial Site Index," Newsbytes Nov. 9, 1994, p. 15.

Michalski, J., "Content in context: the Future of SGML and HTML," Release 1.0, Sep. 27, 1994, pp. 1–10.

Metcalf, R.M., "Commercialization of the Internet Opens Gateways to Interpreneurs," InfoWorld, Aug. 8, 1994, p. 44.

"MaX.500—a Macintosh X.500 Directory Client", contents of WWW website, http://www.umich.edu/–dirsvcs/ldap/max500/index.htlm as of Jul. 7, 1997.

Droms, R.E., "Access to Heterogenous Directory Services," Proceedings IEEE INFOCOM '90, pp. 1054–1061, San Francisco, CA, Jun. 3–7, 1990.

Good, B., "Experience with Bank of America's Distributive Computing System," pp. 2–8, IEEE 1983.

Inselberg, A., "An Approach to Successful Online Transaction Processing Applications," AFIPS Conference Proceedings, 1985 National Computer Conference, pp. 419–427, Chicago, IL, Jul. 15–18, 1985.

Bowman, et al., "Univers: An Attribute–Based Name Server," Software Practice and Experience, vol. 20(4) 403–424 (Apr. 1990).

NCSA HTTPd 1.5 Beta How to Redirect, "The New Redirect Directives."

Housel, B.C., et al., "SNA Distribution Services," IBM Systems Journal, pp. 319–343, vol. 22, No. 4, 1983.

Zatti, et al., "Naming and Registration for IBM Distributed Systems," IBM Systems Journal, pp. 353–380, vol. 31, No. 2, 1992.

Welch, B., et al., "Prefix Tables: A Simple Mechanism for Locating Files in a Distributed System," pp. 184–189, $6^{th}$ International Conference on Distributed Computing Systems, IEEE Computer Society, Cambridge, MA, May 1996.

Schwartz, et al., "A Name Service for Evolving, Heterogeneous Systems," Proceedings of the $11^{th}$ ACM Symposium on Operating Systems Principles, vol. 21, No. 5, pp. 52–62, Austin, TX, Nov. 1987.

Hitchens, M., et al., "Bindings Between Names and Objects in a Persistent System," Proceedings of the $2^{nd}$ International Workshop on Object Orientation in Operating Systems, IEEE Computer Society, pp. 26–37, Dourdan, FR, Sep. 1992.

Sheltzer, et al., "Name Service Locality and Cache Design in a Distributed Operating System," University of California, Los Angeles, 8 pgs.

Andrade, et al., "Open On–Line Transaction Processing with the Tuxedo System," pp. 368–371, Digest of Papers, IEEE Computer Society Press, Compson Spring 1992, San Francisco, California.

Terry, D.B., "Structure–free Name Management for Evolving Distributed Envrivonments," pp. 502–508, $6^{th}$ International Conference on Distributed Computing Systems, IEEE Computer Society, Cambridge, MA, May 1986.

Cheriton D.R., et al., "Uniform Access to Distributed Name Interpretation in the V–System," pp. 290–297, $4^{th}$ International Conference on Distributed Computing System, IEEE Computer Society, San Francisco, CA, May 1984.

Lampson, B.W., "Designing a Global Name Service,", pp. 1–10, Proceedings of the $5^{th}$ Annual ACM Symposium on Principles of Distributed Computing, ACM, Calgary, Alberta, Canada, Aug. 1986.

Curtis, R., et al., "Naming in Distributed Language Systems," pp. 298–302, $4^{th}$ International Conference on Distributed Computing Systems, IEEE Computer Society, San Francisco, CA May 1984.

Squillante, M.C., et al., Integrating Heteregeneous Local Mail Systems, pp. 59–67, IEEE Software, Nov. 1989.

Schwartz, M.F., et al., Experience with a Semantically Cognizant Internet White Pages Directory Tool, Journal of Internetworking: Research and Experience, pp. 1–22 (1990).

Ordille, J.J., et al., "Nomenclater Descriptive Query Optimization for Large X.500 Environments," pp. 185–196, SIGCOM '91 Conference, Communication Architectures & Protocols, vol. 21, No. 4, Zurich, Switzerland, Sep. 1991.

Notkin, D., "Proxies: A Software Structure for Accomodating Hetergeneity," Software–Practice and Experience, vol. 20(4), 357–364, Apr. 1990.

Bjorn N. Freeman–Benson," Using the Web to Provide Private Information," First International Conference on the World Wide Web, WWW94, May 1994, 5 pages.

Rescorla, E., et al., "The Secure HyperTest Transfer Protocol," Aug. 1999.

Lou Montulli, Electronic Mail to Multiple Recipients of the www–talk list (www–talk.1995q2/0134.html on "Session Tracking" (omi.mail.www–talk, Apr. 18, 1995).

Ramanathan, Sirvivas, et al., "Architectures for Personalized Multimedia," IEEE Multimedia, vol. 1, No. 1, Computer Society, pp. 37–46, 1994.

Choudhury, Abhijit K., et al., "Copyright Protection for Electronic Publishing Over Computer Networks," IEEE Network, The Magazine of Computer Communications, vol. 9, No. 3, pp. 12–20, May 1995.

"Persistent Client State HTTP Cookies," http://search-.netscape.com/newsref/std/cookie_spec.html (Jan. 9, 1998). "HTTP State Management Mechanism," http://www.internic.net/rfc/rfc2109.txt (Jan. 9, 1998)—http://www.cse.ohio–state.edu/cgi–bin/rfc/rfc2965.html.

Pitkow, J.E., and Recker, M.M., Using the Web as a Survey Tool: Results from Second WWW User Survey,: http://www.igd.fhg.de/archive/1995_www95/papers/79/survey/survey_2_paper.html.

Peterson, Larry L., "A Yellow–Pages Service for a Local–Area Network," ACM Proceedings of the ACM SIG-COMM 87 Workshop, ACM Press, 1988, pp. 235–242.

Kahan, Jose, "A Distributed Authorization Model for WWW," http://www.isoc.org/HMP/PAPER/107/html/paper.html, pp. 1–16.

Kahan, Jose, "A capability–based authorization model for the World–Wide Web," http://www.igd.fhg.de/archive/1995_www95/proceedings/papers/86/CaMWWW.htlm, pp. 1–14.

Kahan, Jose, "A New Authorization Model for Distributed Multimedia Information Consultation Systems," English Translation, pp. 1–21.

Berners–Lee, T., et al., http://www.ietf.org/rfc/rfc1738.txt?numbers=178.

Gary Welz, "The Media Business on the WWW", Proceedings of the Second World Wide Web Conference 1994: Mosaic and the Web, Oct. 1994, 6 pages.

Clickstream, Oct. 1996, The word Spy, [http:www.wordspy.com/words/clickstream.asp], 2 pages.

Bob Novick, (9503) Internet Marketing: The Clickstream, Mar. 1995, [http://www.i-m.com/archives/9503/0375.html] 3 pages.

Kahan, Jose, "Un nouveau modele d-autorisation pour les systemes de consultation d-information multimedia repartee," pp. 45-57.

Brian W. Kernighan and Dennis M. Ritchie, "The C Programming Language" second edition, AT&T Bell Laboratories, (N.J., Prentice Hall) pp. 17-21 (1998).

Computer and Business Equipment Manufacturers Association, "American National Standard for Information Systems-Database Language SQL" (N.Y., American National Standards Institute) pp. 27-28 (1986).

Aho, A.V., et al., "Reports and Databases." In the AWK Programming Language, M.A. Harrison, ed., (Addison-Wesley), pp. 100-101 (1988).

Kelley, A., and Pohl, I., "Arrays, Strings, and Pointers." In a Book on C, A. Apt. ed., (the Benjamin/Cummings Publishing Company, Inc.,) pp. 35-37 (1984).

WordPerfect for Macintosh, pp. 153-162 (1990).

"Here it is, World" internet postings to comp.infosystems.www.users discussion list re: Mosaic Netscape (Oct. 13, 1994-Oct. 17, 1994) available at: http://groups.google.com/group/comp.infosystems.www.users/browse_thread/thread/3666fe4e21b3a9c2/9a210e5f72278328?lnk=st&rnum=5&hl=en#9a210e5f72278328.

"Netscape 0.93 Setup Questions" internet postings to comp.infosystems.www.misc discussion list re: Mosaic Netscape (Nov. 21, 1994-Nov. 25, 1994) available at: http://groups.google.com/group/comp.infosystems.www.misc/browse_thread/thread/da4e82efc6512f67/8dabc347291409d5?lnk=st&rnum=1&hl=en#8dabc347291409d5.

"Netscape and Cookies" internet postings to comp.infosystems.www.users discussion list re: Mosaic Netscape (Dec. 11, 1994-Dec. 13, 1994) available at: http://groups.google.com/group/comp.infosystems.www.users/browse_thread/thread/5347cb89bbae572b/3583cab5e6c13e94?lnk=st&rnum=3&hl=en#3583cab5e6c13e94.

"Cookies.txt" internet postings to comp.infosystems.www.users discussion list re: Mosaic Netscape (Dec. 23, 1994-Dec. 27, 1994) available at: http://groups.google.com/group/comp.infosystems.www.users/browse_thread/thread/613e81948e9cf6e4/134ade72dfc1c58d?lnk=st&rnum=2&hl=en#134ade72dfc1c58d.

"How to get statefull HTML documents" internet postings to comp.infosystems.www.misc discussion list (Jun. 24, 1994-Jun. 25, 1994) available at: http://groups.google.com/group/comp.infosystems.www.misc/browse_thread/thread/fd304fedb645529a/b8f6dab2aa73ae71?lnk=st&rnum=7&hl=en#b8f6dab2aa73ae71.

"How to add state info to a form" internet postings to comp.infosystems.www.providers discussion list (Jun. 30, 1994-Jul. 1, 1994) available at: http://groups.google.com/group/comp.infosystems.www.providers/browse_thread/thread/2acad6cdc8ebb8a/bf368e630add2c94?lnk=st&rnum=8&hl=en#bf368e630add2c94.

"Transactional Services on WWW" internet postings to comp.infosystems.www discussion list (May 12, 1994-Jun. 1, 1994) available at: http://groups.google.com/group/comp.infosystems.www/browse_thread/thread/bf430e6df8e6e7d/8ed77a97f5d0b9d6?lnk=st&hl=en#8ed77a97f5d0b9d6.

Dan Aronson, "access and session control" posting to www-talk discussion list (Sep. 14, 1994) available at: http://1997.webhistory.org/www.lists/www-talk.1994q3/0901.html.

Rick Troth, "access and session control" (Sep. 15, 1994) available at: http://1997.webhistory.org/www.lists/www-talk.1994q3/0923.html.

alain@hyperman.co.il, "Identifying Mosaic session" posting to www-talk discussion list (Dec. 20, 1994) available at http://1997.webhistory.org/www.lists/www-talk.1994q4/1098.html.

Joe English, "Re: Identifying Mosaic session", posting to www-talk discussion list (Dec. 20, 1994 available at: http://1997.webhistory.org/www.lists/www-talk.1994q4/1109.html.

Steven Majewski, "Identifying Mosaic session" posting to www-talk discussion list (Dec. 20, 1994) available at: http://1997.webhistory.org/www.lists/www-talk.1994q4/1111.html.

Nick Arnett, "Statelessness" posting to www-talk discussion list (May 16, 1994) available at: http://1997.webhistory.org/www.lists/www-talk.1994q2/0562.html.

Jared Rhine, "Statelessness" posting to www-talk discussion list (May 16, 1994) available at: http://1997.webhistory.org/www.lists/www-talk.1994q2/0563.html.

Simon Spero, "Statelessness" posting to www-talk discussion list (May 17, 1994) available at: http://1997.webhistory.org/www.lists/www-talk.1994q2/0579.html.

Jim McBeath, "Statelessness" posting to www-talk discussion list (May 27, 1994) available at: http://1997.webhistory.org/www.lists/www-talk.1994q2/0683.html.

Phillip Hallam-Baker, "Statelessness" posting to www-talk discussion list (May 30, 1994) available at: http://1997.webhistory.org/www.lists/www-talk.1994q2/0705.html.

Gifford, Stewart, Payne, Treese, "Payment Switches for Open Networks," presented at 40th IEEE, IEEE, COMPCON '95, Mar. 5-9, 1995, San Francisco, CA.

Defendant Amazon.com Inc.'s Unopposed Motion for Leave to Amend its Answer to Include Allegations Regarding Stuff.com.

Declaration of James E. Geringer in Support of Amazon.com, Inc's Motion for Leave to Amend its Answer and Counterclaims to Add Stuff.com.

Exhibit 1 of Geringer Declaration: Excerpts of Deposition of Michael Kuniavsky.

Exhibit 2 of Geringer Declaration: E-mail from Brooks Cutter to Mike Kuniavsky (Jun. 14, 1994).

Exhibit 3 of Geringer Declaration: Excerpts of Deposition of Richard Boake.

Exhibit 5 of Geringer Declaration: Excerpts of Deposition of Andrew Payne.

Exhibit 6 of Geringer Declaration: E-mail from Andrew Payne to Winfield Treese, et al. (Jun. 15, 1994).

Exhibit 7 of Geringer Declaration: Excerpts of Deposition of Winfield Treese.

Exhibit 8 of Geringer Declaration: Amazon.com, Inc.'s [Proposed] fourth Amended Answer, Affirmative Defenses, and Counterclaims to Soverain Software, LLC's Complaint (Redlined Version).

Amazon.com's Motion for Partial Summary Judgment that '314 claims 34-39, '492 claims 17-18 and 35-36, and '780 claims 1, 4, and 22-24 are invalid under 35 U.S.C. 102.

Amazon.com's Motion for Partial Summary Judgment that claims are indefinite under 35 U.S.C. 112.

Berners–Lee, T., et al., http://www.ietf.org/rfc/rfc1738.txt?numbers=1738.

Changes to wwwStat at http://ftp.ics.uci.edu/pub/websoft/wwwstat/Changes.

Berners–Lee, T., RFC 1630: Universal Resource Identifiers in WWW: A Unifying Syntax for the Expression of Names and Addresses of Objects on the Network as used in the World–Wide Web.

Berners–Lee, T., et al. RFC 1738: Uniform Resource Locators.

Fielding, R., RFC 1808: Relative Uniform Resource Locators.

Berners–Lee, T., et al. RFC 1945: Hypertext Transfer Protocol—HTTP/1.0.

Fielding, R., et al. RFC 2068: Hypertext Transfer Protocol—HTTP/1.1.

Fielding, R., et al. RFC 2616: Hypertext Transfer Protocol—HTTP1/1.

Berners–Lee, T. "draft–ietf–iiir–http–00.txt" (Nov. 5, 1993).

wwwStat Readme file at http://ftp.ics.uci.edu/pub/websoft/wwwstat/README.

NCSA HTTPd release notes at http://hoohoo.ncsa.uiuc.edu/docs/Upgrade.html (last updated Aug. 1, 1995).

Crocker, Glenn, "web2mush: Serving Interactive Resources to the Web," Electronic Proc. of the 2nd World Wide Web Conf. '94: Mosaic and the Web!, Developers Days, (Oct. 20, 1994).

Dukach, Seymon; Prototype Implementation of the SNPP Protocol; allspic.lcs.mit.edu; 1992.

Batelaan; Butler; Chan; Chen; Evenchick; Hughes; Jen; Jeng; Millett; Riccio; Skoudis; Starace; Stoddard; "An Internet Billing Server Prototype Design"; Carnegie Mellon.

O'Mahony, Donal, Michael Peirce, & Hitesh Tewari, Electronic Payment Systems, Artech House, Inc., pp. 145–155, Jan. 1997.

Maren, Michael, "The Age of E–Mail," Home Office Computing, vol. 11, No. 12, p. 63(5).

Foster, David & Stuart Finn, "Insurers Can Benefit From E–Mail Networks", National Underwriter Property & Casualty–Rick & Benefits Management, No. 9, p. 46(2), Mar. 4.

Ferrarini, E., "Flight of Fancy: Goodbye Travel Agent", Business Computer Systems, vol. 2, No. 11, pp. 39–40, Nov. 1993.

Trip et al., "Cookies" (client–side persistent information) and their use, Netscape Technical Note 20019, Netscape Communications Corp., Oct. 1995.

Archive of WWWorder mailing list (Jun. 18, 1994–Jun. 13, 1994).

Leggett, John et al., "Hyperform: Using Extensibility to Develop Dynamic, Open and Distributed Hypertext Systems" (1992).

Bieber, Michael, "Issues in Modeling a 'Dynamic' Hypertest Interface for Non–Hypertext Systems" (1991).

Nielson, Jacob, *Hypertext & Hypermedia* (1990).

"Announcing: Internet Shopkeeper" (Aug. 21, 1994) posting on comp.infosystems.www and misc.forsale.

Eaasy Sabre User's Guide and Eaasy Sabre Reference Guide.

Compuserve Manual (undated).

The Major BBS: Collection of information and Advertisements concerning The Major BBS (Fall 1993).

Fielding, Roy, et al., "Principled Design of the Modern Web Architecture" *ACM Transactions on Internet Technology 2*, 2 pp. 115–150 (May 2002).

Smithson, Brian, and Singer, Barbara, An Information Clearinghouse Server for Industry Consortia, 2nd Int'l Conf. On the World Wide Web, Chicago, Ill., Oct. 1994.

Soverain's ANSWER to Counterclaim (Amazon's Third Amended Counterclaim) by Soverain Software LLC.(Seraphine, Jennifer) (Entered: Mar. 17, 2005).

NOTICE by Amazon.com re: Answer to Amended Complaint, Counterclaim Of Rejection Of Claims 1–45 Of U.S. Patent No. 5,708,780 (Entered: Mar. 25, 2005).

MOTION to Stay [Renewed] by Amazon.com. (Entered: Apr. 5, 2005).

Soverain's Opposition to Amazon's Renewed Motion to Stay.

Amazon.Com, Inc.'s Reply in Support of Renewed Motion to Stay.

Deposition of Glenn Arthur Hauman with Exhibits (Oct. 28, 2004).

Deposition of Glenn Crocker with Exhibits (Mar. 10, 2005).

Deposition of Glenn M. Trewitt with Exhibits (Jan. 25, 2005).

Deposition of Guy Henry Timothy Haskin with Exhbits (Mar. 18, 2005).

Deposition of Joshua Smith with Exhibits (Mar. 2, 2005).

Deposition of Kevin Ming–Wei Kadaja Hughes with Exhibits (Mar. 21, 2005).

Deposition of Michael Kuniavsky with Exhibits (Feb. 22, 2005).

Deposition of Michael Lazzaro with Exhibits (Mar. 9, 2005).

Deposition of Phillip Hallam–Baker with Exhibits (Mar. 11, 2005).

Deposition of Robert Allen Olson with Exhibits (Mar. 3, 2005).

Deposition of Thomas Soulanille with Exhibits (Mar. 14, 2005).

Expert Report of Alexander B. Trevor (Apr. 10, 2005).

Reply to Response to Motion re: Motion to Stay [Renewed] (*Surreply in Opposition to Amazon's Renewed Motion to Stay*) filed by Soverain Software LLC.

"It will happen", article excerpt from infoHighway, vol. 2–1, Jan. 1995.

Aronson, Dan, et al., Electronic Mail to multiple recipients of the www–talk list (www–talk@info.cern.ch) on "Access and session control" dated Sep. 15, 1994.

Derler, Christian, "The World–Wide Web Gateway to Hyper–G: Using a Connectionless Protocol to Access Session–Oriented Services", Institut für Informationsverarbeilung and Computergestützte neue Medien, Graz, Austria, dated Mar. 1995.

English, Joe, Electronic Mail to multiple recipients of the www–talk list (www–talk@info.cern.ch) on "Re: Identifying Mosaic session" dated Dec. 20, 1994.

Fielding, Roy, software distribution archive for the HTTP log file analysis program, wwwstat v1.01, dated Apr. 24, 1994, published at http://www.ics.uci.edu/WebSoft/www-stat/.

Hall, Devra, et al., "Build a Web Site: The Programmer's Guide to Creating, Building, and Maintaining a Web Presence", published Apr. 1995. ISBN 0–7615–0064–2.

Hughes, Kevin, source code file for the HTTP log file analysis program, getstats v1.0, dated Feb. 1, 1994, published at http://eit.com/software/getstats/getstats.html.—Version 1, 64 pages.

Hughes, Kevin, source code file for the HTTP log file analysis program, getstats v1.0, dated Feb. 1, 1994, published at http://eit.com/software/getstats/getstats.html—Version 2, 64 pages.

McCartney, Todd, Message posted to Usenet public discussion group, rec.arts.disney, dated Nov. 21, 1994.

Pitkow, et al., "Results from the First World Wide Web Use Survey", presented at the First International Conference on the World Wide Web, Geneva, Switzerland, May 25–27, 1994, published at http://www94.web.cern.ch/WWW94/PrelimProcs.html on Jun. 2, 1994, and reprinted in the Journal of Computer Networks and ISDN Systems, vol. 27, No. 2., Nov. 1994, Elsevier Science B.V.

The NetMarket Company, NetMarket PGP Help file, from http://www.netmarket.com, dated Dec. 10, 1994.

Trewitt, Glenn, "Using Tcl to Proceess HTML Forms", Digital Equipment Corporation, Network Systems Laboratory TN–14, dated Mar. 1994.

"Advanced Electronic Credit Authorization Through the Amherst Group SNET", News Release, New Haven, CT, Dec. 7, 1987, 2 pages.

Anderson, Scot et al., "Sessioneer: Flexible Session Level Authentication With Off the Shelf Servers and Clients", http//:www.igd.fhg.de/archive/1995_www95/papers/77/sessioneer2.html, pp. 1–7.

Buhle, E. Loren Jr., "Wide Area Information Servers", Digital Systems Journal, Sep./Oct. 1994, pp. 13–16.

Comer, D., et al., "The Tilde File Naming Scheme", The $6^{th}$ International Conference on Distributed Computing Systems, IEEE Computer Society, Cambridge, MA., May 1996, pp. 509–514.

Comer, D.E., et al., "A Model of Name Resolution in Distributed Systems", The $6^{th}$ International Conference on Distributed Computer Systems, IEEE Computer Society,, Cambridge, MA, May 1996, pp. 523–530.

Computer Fraud & Security Bulletin, "Underlying Security Mechansms", Mar. 1997, 2 pages.

Cookies and Privacy FAQ, http://search.netscape.com/assist/security/faqs/cookies.html Jan. 9, 1998 at 4:29 pm., pp. 1–3.

Crocker, Glenn, "web2mush: Serving Interactive Resources to the Web", $2^{nd}$ International Conference on the WorldWide Web, Chicago, Illinois , Oct. 1994, 7 pages.

Net Market Company, "Numerous News Media Stories", New York Times, Front Page of Business Section, Aug. 12, 1994, 4 pages.

Phillips, K., "SuperHighway Access Eases Internet Entry", PC Week, Oct. 31, 1994, 3 pages.

Poler, Ariel, "Improving WWW Marketing Through User Information and Non–Intrusive Communications", Internet Profiles Corporation (I/PRO), $2^{nd}$ WWW Conference, Chicago, Illinois, Oct. 1994, 4 pages.

Soverain's Disclosure of Asserted Claims and Preliminary Infringement Contentions dated Jun. 3, 2004.

Supplemental Disclosure of Preliminary Invalidity Contentions by Amazon and the Gap dated Jul. 26, 2004.

Deposition of G. Winfield Treese, dated Oct. 27, 2004.

Soverain's Reply to Amazon.Com's Amended Counterclaims, dated Jan. 14, 2005.

Third Supplement to Defendant Amazon's Initial Disclosures, dated Mar. 4, 2005.

VideoTaped Deposition of Mark Levergood dated Mar. 8, 2005 (2 parts).

VideoTaped Deposition of Andrew Payne dated Mar. 11, 2005.

VideoTaped Deposition of Stephen Morris dated Mar. 9, 2005.

VideoTaped Deposition of Glenn Trewitt dated Jan. 25, 2005 (2 parts).

Soverain's Fourth Supplemental Responses to Amazon's First Set of Interrogatores (Nos. 1–14) dated Mar. 21, 2005.

Soverain's Responses to Interrogatory Nos. 22, 23, 26 and 36 of Amazon's Third Set of Interrogatores (Nos. 17–28) dated Mar. 21, 2005.

Soverain's Responses to Amazon's First Set of Requests for Admission to Plaintiff Soverain Software (Nos. 1–100) dated Mar. 21, 2005.

Memorandum Opinion dated Apr. 7, 2005.

Soverain's Reply to Amazon's Third Amended Counterclaims, dated Mar. 17, 2005.

Amazon.com's Renewed Motion to Stay Proceedings Until the Patent and Trademark Office Completes Re–Examination of the Three Patents in Suit, dated Apr. 5, 2005.

NCSA "What's New"http://archive.ncsa.uiuc.edu/SDG/Software/Mosaic/Docs/old–whats–new/whats–new–0294.html, Feb. 28, 1994, 17 pages.

Business Wire, CommerceNet Urges Government to Ease Export Restrictions on Encryption Products; Consortium's New White Paper Articulates Position on the Export of Cryptography–Based Products, Jun. 26, 1995, 2 pages.

Motoda, Toshihiro et al., *An Experimental Verification of Relational Database Access Over WWW*, NTT Software Laboratories, Nippon Telegraph and Telephone Corporation, 1995, pp. 47–54 (with English Translation—8 pages).

Ohmori et al., "An On–line Shopping System Protecting User's Privacy", Information Communication Laboratory of Matsushita Electric Industrial Co., Ltd. , pp. 25–32. Note: 12 Pages of Translation Attached.

Bina et al., "Secure Access to Data Over the Internet", Natl. Center for Supercomputing Appls., Unv. Of Illinois, Champaign, Illinois, pp. 99–102.

Farber, David, "Interesting–People Message—RSA/NCSA/EIT Announcement on Secure Mosiac" Palo Alto, California, Apr. 12, 1994, 4 pages.

Kent, Stephen T., "Internet Privacy Enhanced Mail", 8070 Communications of the ACM 36, New York, Aug. 1993, pp. 48–60.

Kohn, Dan, "Prior Art on Open Market Patents", e–mail message dated Mar. 9, 1998, 1 page.

Lewis, Peter H., "Attention Shoppers: Internet is Open", 2 pages.

Medvinsky et al., NetCash: A Design for Practical Elecronic Currency on the Internet, Information Sciences Institute, University of Southern California, 1993, pp. 102–106.

Schaefer et al., "Networked Information Discovery and Retrieval Tools: Security Capabilities and Needs", The MITRE Corporation, 1994, pp. 145–153.

European Search Report dated Jun. 19, 2006.

*Soverain Software LLC* v. *Amazon.Com, Inc. and The Gap, Inc.,* Form of Stipulated Request for Final Dismissals of the Actions, filed Aug. 30, 2005.

*Soverain Software LLC* v. *Amazon.Com, Inc. and The Gap, Inc.,* Order of Dismissal with Prejudice filed Aug. 31, 2005.

\* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–48 is confirmed.

New claims 49–168 are added and determined to be patentable.

49. A network-based sales system in accordance with claim 34, wherein the buyer computer activates the payment message by transmitting a message to the shopping cart computer that causes the payment message to be activated.

50. A network-based sales system in accordance with claim 34, wherein the network is a public packet switched network.

51. A network-based sales system in accordance with claim 34, wherein the network is an Internet.

52. A network-based sales system in accordance with claim 34, further comprising:
   a merchant computer that is interconnected with the buyer computer and shopping cart computer by the computer network; and
   an advertising document database;
   wherein the merchant computer is programmed to fetch an advertising document from the advertising document database.

53. A network-based sales system in accordance with claim 52, wherein the merchant computer is programmed to send one or more advertising documents to the buyer computer.

54. A network-based sales system in accordance with claim 53, wherein the merchant computer is programmed to provide a product requested by the user.

55. A network-based sales system in accordance with claim 54, wherein the merchant computer is programmed to respond to payment orders from the buyer computer without the merchant computer having to communicate directly with the shopping cart computer to ensure that the user is authorized to purchase the product;
   wherein the merchant computer is programmed to respond to payment orders from the buyer computer without the merchant computer having to store information in a database regarding which buyers are authorized to purchase which products.

56. A network-based sales system in accordance with claim 53, wherein the advertisement documents are in the form of summaries of newspaper or newsletter articles;
   wherein prior to a user's product request, the merchant computer sends an advertising document to the buyer computer.

57. A network-based sales system in accordance with claim 34, wherein the buyer computer transmits an initial link that comprises information from which the shopping cart computer can create a session link message;
   wherein the session link is transmitted from the shopping cart computer to the buyer computer;
   wherein the session link message includes a session link authenticator for use by a computer to authenticate the session link message.

58. A network-based sales system in accordance with claim 57, wherein the session link authenticator is a cryptographic function of the session link contents.

59. A network-based sales system in accordance with claim 58, wherein the buyer computer is programmed to cause the session link message to be sent to a computer in the network which is programmed to authenticate the session link message by examining the session link authenticator and which is programmed to respond to the session link message based on state of the interaction between the buyer computer and the shopping cart computer.

60. A network-based sales system in accordance with claim 34, wherein at least one of the requests comprises a shopping cart URL.

61. A network-based sales system in accordance with claim 60, wherein the shopping cart URL comprises a domain identifier.

62. A network-based sales system in accordance with claim 60, wherein the shopping cart URL comprises a merchant identifier.

63. A network-based sales system in accordance with claim 60, wherein the shopping cart URL comprises a merchant account identifier.

64. A network-based sales system in accordance with claim 60, wherein the shopping cart URL comprises a payment amount.

65. A network-based sales system in accordance with claim 60, wherein the shopping cart URL comprises a product identifier.

66. A network-based sales system in accordance with claim 60, wherein the shopping cart URL comprises a duration time.

67. A network-based sales system in accordance with claim 60, wherein the shopping cart URL comprises an expiration time.

68. A network-based sales system in accordance with claim 67, wherein the shopping cart computer transmits a document to the buyer computer indicating that the expiration time has passed.

69. A network-based sales system in accordance with claim 60, wherein the URL comprises a buyer network address.

70. A network-based sales system in accordance with claim 69, wherein the buyer computer network address is verified by matching it with a network address specified in the shopping cart URL.

71. A network-based sales system in accordance with claim 70, wherein if the computer network address verification fails, then the shopping cart computer sends a document to the buyer computer indicating that access is not allowed.

72. A network-based sales system in accordance with claim 60, wherein the shopping cart URL comprises an authenticator based on a cryptographic key;
   wherein the authenticator is a function of contents of the shopping cart URL;
   wherein the shopping cart computer verifies whether the shopping cart URL authenticator was created from the contents of the shopping cart URL using a cryptographic key.

73. A network-based sales system in accordance with claim 72, wherein if the verification fails, the shopping cart computer transmits a document to the buyer computer indicating that access is denied.

74. A network-based sales system in accordance with claim 34, wherein the buyer computer activates the payment message by transmitting a message to the shopping cart computer that causes the payment message to be activated;

wherein the shopping cart computer transmits a payment confirmation document to the buyer computer.

75. A network-based sales system in accordance with claim 74, wherein the payment confirmation document includes an open link and a continue link.

76. A network-based sales system in accordance with claim 75, wherein the shopping cart computer opens a new account in response to the user selecting the open link.

77. A network-based sales system in accordance with claim 76, wherein the buyer computer sends a payment URL to the shopping cart computer that indicates that an account does not yet exist.

78. A network-based sales system in accordance with claim 77, wherein the shopping cart computer creates a new account document.

79. A network-based sales system in accordance with claim 78, wherein the shopping cart computer transmits the new account document to the buyer computer.

80. A network-based sales system in accordance with claim 79, wherein the new account document comprises a challenge form that requests account information to be entered by the user.

81. A network-based sales system in accordance with claim 80, wherein the account information comprises a new account name and account password.

82. A network-based sales system in accordance with claim 80, wherein the account information comprises: a new account name, an account password, a credit card number, and an expiration date of the credit card.

83. A network-based sales system in accordance with claim 80, wherein the account information comprises security information.

84. A network-based sales system in accordance with claim 34, wherein the shopping cart computer, in response to the plurality of shopping cart messages, causes an account name and password request message to be transmitted to the buyer computer.

85. A network-based sales system in accordance with claim 34, further comprising:

a merchant computer that is interconnected with the buyer and shopping cart computers by the computer network; and an advertising document database;

wherein the merchant computer is programmed to fetch an advertising document from the advertising document database;

wherein the advertising document database is local to the merchant computer.

86. A network-based sales system in accordance with claim 85, wherein a creation computer updates the remote advertising document database on the merchant computer.

87. A network-based sales system in accordance with claim 85, wherein the buyer computer transmits a purchase product message to the merchant computer, and, in response, the merchant computer provides a payment URL to the buyer computer.

88. A network-based sales system in accordance with claim 87, wherein the buyer computer transmits the payment URL to a payment computer.

89. A network-based sales system in accordance with claim 88, wherein the payment computer is the shopping cart computer.

90. A network-based sales system in accordance with claim 88, wherein the payment URL comprises an authenticator based on a cryptographic key;

wherein the authenticator is a function of contents of the payment URL.

91. A network-based sales system in accordance with claim 90, wherein the payment computer verifies whether the payment URL authenticator was created from the contents of the payment URL using a cryptographic key;

if the verification fails, the payment computer transmits a document to the buyer computer indicating that access is denied.

92. A network-based sales system in accordance with claim 88, wherein the payment URL further comprises an expiration time.

93. A network-based sales system in accordance with claim 92, wherein the payment computer transmits a document to the buyer computer indicating that the expiration time has passed.

94. A network-based sales system in accordance with claim 88, wherein the payment URL comprises a buyer network address.

95. A network-based sales system in accordance with claim 94, wherein the buyer computer network address is verified by matching it with the network address specified in the payment URL;

if the verification fails, then the shopping cart computer sends a document to the buyer computer indicating that access is not allowed.

96. A network-based sales system in accordance with claim 88, wherein the payment computer transmits a payment confirmation document to the buyer computer;

wherein the payment confirmation document includes an open link and a continue link;

wherein in response to the user selecting the continue link, the payment computer instructs the buyer computer to provide an account name and password that have previously been provided by the buyer computer to the payment computer.

97. A network-based sales system in accordance with claim 96, wherein the buyer computer prompts the user for the account name and password by creating an account name prompt and a password prompt.

98. A network-based sales system in accordance with claim 97, wherein the payment computer verifies that the account name and password entered by the user match a previously provided account name and password.

99. A network-based sales system in accordance with claim 98, wherein if the verification fails, then the payment computer sends a document to the buyer computer indicating that access is not allowed.

100. A network-based sales system in accordance with claim 98, wherein if a payment amount exceeds a threshold, then the user is prompted for security information;

wherein the payment computer verifies that the security information matches a previously provided account name and password;

if the verification fails, then the payment computer sends a document to the buyer computer indicating that access is not allowed.

101. A network-based sales system in accordance with claim 98, further comprising a settlement database that is in communication with the payment computer;

wherein the settlement database is used to determine whether the user has unexpired access to a domain identified in the payment message;

wherein the user is presented with an option to repurchase or to use the unexpired access.

102. A network-based sales system in accordance with claim 101, wherein the purchase of a product in a certain domain by a user account entitles access to other products in the domain for free or at a reduced price.

103. A network-based sales system in accordance with claim 98, wherein the payment computer verifies whether the user account has sufficient funds or credit that satisfies a payment amount specified in the payment message,
if the verification fails, then the payment computer sends a document to the buyer computer indicating that the user has insufficient funds.

104. A network-based sales system in accordance with claim 98, wherein the payment computer records an end of duration time in a settlement database.

105. A network-based sales system in accordance with claim 98, wherein the payment computer creates an access URL including an access URL authenticator that is a digital signature generated based on a cryptographic key;
wherein the access URL authenticator is a hash of other information in the access URL;
wherein the payment computer sends a redirect to the access URL to the buyer computer;
wherein the buyer computer sends the access URL to a merchant computer.

106. A network-based sales system in accordance with claim 105, wherein the merchant computer verifies whether the access URL authenticator was created from said other information in the access URL using the cryptographic key;
if the verification fails, then the merchant computer sends a document to the buyer computer indicating that access is not allowed.

107. A network-based sales system in accordance with claim 105, wherein the merchant computer verifies whether a duration time for access has expired;
if the verification fails, then the merchant computer sends a document to the buyer computer indicating that the duration time has expired.

108. A network-based sales system in accordance with claim 105, wherein the merchant computer verifies that a buyer computer network address is the same as a buyer network address contained in the access URL;
if the verification fails, then the merchant computer sends a document to the buyer computer indicating that access is not allowed.

109. The method of claim 39, wherein the buyer computer activates the payment message by transmitting a message to the shopping cart computer that causes the payment message to be activated.

110. The method of claim 39, wherein the network is a public packet switched network.

111. The method of claim 39, wherein the network is an Internet.

112. The method of claim 39, wherein a merchant computer is interconnected with the buyer computer and shopping cart computer by the computer network;
wherein the merchant computer is programmed to fetch an advertising document from an advertising document database.

113. The method of claim 112, wherein the merchant computer is programmed to send one or more advertising documents to the buyer computer.

114. The method of claim 113, wherein the merchant computer is programmed to provide a product requested by the user.

115. The method of claim 114, wherein the merchant computer is programmed to respond to payment orders from the buyer computer without the merchant computer having to communicate directly with the shopping cart computer to ensure that the user is authorized to purchase the product;
wherein the merchant computer is programmed to respond to payment orders from the buyer computer without the merchant computer having to store information in a database regarding which buyers are authorized to purchase which products.

116. The method of claim 113, wherein the advertisement documents are in the form of summaries of newspaper or newsletter articles;
wherein prior to a user's product request, the merchant computer sends an advertising document to the buyer computer.

117. The method of claim 39, wherein the buyer computer transmits an initial link that comprises information from which the shopping cart computer can create a session link message;
wherein the session link is transmitted from the shopping cart computer to the buyer computer;
wherein the session link message includes a session link authenticator for use by a computer to authenticate the session link message.

118. The method of claim 117, wherein the session link authenticator is a cryptographic function of the session link contents.

119. The method of claim 118, wherein the buyer computer is programmed to cause the session link message to be sent to a computer in the network which is programmed to authenticate the session link message by examining the session link authenticator and which is programmed to respond to the session link message based on state of the interaction between the buyer computer and the shopping cart computer.

120. The method of claim 39, wherein at least one of the requests comprises a shopping cart URL.

121. The method of claim 120, wherein the shopping cart URL comprises a domain identifier.

122. The method of claim 120, wherein the shopping cart URL comprises a merchant identifier.

123. The method of claim 120, wherein the shopping cart URL comprises a merchant account identifier.

124. The method of claim 120, wherein the shopping cart URL comprises a payment amount.

125. The method of claim 120, wherein the shopping cart URL comprises a product identifier.

126. The method of claim 120, wherein the shopping cart URL comprises a duration time.

127. The method of claim 120, wherein the shopping cart URL comprises an expiration time.

128. The method of claim 127, wherein the shopping cart computer transmits a document to the buyer computer indicating that the expiration time has passed.

129. The method of claim 120, wherein the URL comprises a buyer network address.

130. The method of claim 129, wherein the buyer computer network address is verified by matching it with a network address specified in the shopping cart URL.

131. The method of claim 130, wherein if the computer network address verification fails, then the shopping cart computer sends a document to the buyer computer indicating that access is not allowed.

132. The method of claim 120, wherein the shopping cart URL comprises an authenticator based on a cryptographic key;

wherein the authenticator is a function of contents of the shopping cart URL;
wherein the shopping cart computer verifies whether the shopping cart URL authenticator was created from the contents of the shopping cart URL using a cryptographic key.

133. The method of claim 132, wherein if the verification fails, the shopping cart computer transmits a document to the buyer computer indicating that access is denied.

134. The method of claim 39, wherein the buyer computer activates the payment message by transmitting a message to the shopping cart computer that causes the payment message to be activated;
wherein the shopping cart computer transmits a payment confirmation document to the buyer computer.

135. The method of claim 134, wherein the payment confirmation document includes an open link and a continue link.

136. The method of claim 135, wherein the shopping cart computer opens a new account in response to the user selecting the open link.

137. The method of claim 136, wherein the buyer computer sends a payment URL to the shopping cart computer that indicates that an account does not yet exist.

138. The method of claim 137, wherein the shopping cart computer creates a new account document.

139. The method of claim 138, wherein the shopping cart computer transmits the new account document to the buyer computer.

140. The method of claim 139, wherein the new account document comprises a challenge form that requests account information to be entered by the user.

141. The method of claim 140, wherein the account information comprises a new account name and account password.

142. The method of claim 140, wherein the account information comprises: a new account name, an account password, a credit card number, and an expiration date of the credit card.

143. The method of claim 140, wherein the account information comprises security information.

144. The method of claim 39, wherein the shopping cart computer, in response to the plurality of shopping cart messages, causes an account name and password request message to be transmitted to the buyer computer.

145. The method of claim 39, wherein a merchant computer is interconnected with the buyer and shopping cart computers by the computer network;
wherein the merchant computer is programmed to fetch an advertising document from an advertising document database;
wherein the advertising document database is local to the merchant computer.

146. The method of claim 145, wherein a creation computer updates the remote advertising document database on the merchant computer.

147. The method of claim 145, wherein the buyer computer transmits a purchase product message to the merchant computer, and, in response, the merchant computer provides a payment URL to the buyer computer.

148. The method of claim 147, wherein the buyer computer transmits the payment URL to a payment computer.

149. The method of claim 148, wherein the payment computer is the shopping cart computer.

150. The method of claim 148, wherein the payment URL comprises an authenticator based on a cryptographic key;
wherein the authenticator is a function of contents of the payment URL.

151. The method of claim 150, wherein the payment computer verifies whether the payment URL authenticator was created from the contents of the payment URL using a cryptographic key;
if the verification fails, the payment computer transmits a document to the buyer computer indicating that access is denied.

152. The method of claim 148, wherein the payment URL further comprises an expiration time.

153. The method of claim 152, wherein the payment computer transmits a document to the buyer computer indicating that the expiration time has passed.

154. The method of claim 148, wherein the payment URL comprises a buyer network address.

155. The method of claim 154, wherein the buyer computer network address is verified by matching it with the network address specified in the payment URL;
if the verification fails, then the shopping cart computer sends a document to the buyer computer indicating that access is not allowed.

156. The method of claim 148, wherein the payment computer transmits a payment confirmation document to the buyer computer;
wherein the payment confirmation document includes an open link and a continue link;
wherein in response to the user selecting the continue link, the payment computer instructs the buyer computer to provide an account name and password that have previously been provided by the buyer computer to the payment computer.

157. The method of claim 156, wherein the buyer computer prompts the user for the account name and password by creating an account name prompt and a password prompt.

158. The method of claim 157, wherein the payment computer verifies that the account name and password entered by the user match a previously provided account name and password.

159. The method of claim 158, wherein if the verification fails, then the payment computer sends a document to the buyer computer indicating that access is not allowed.

160. The method of claim 158, wherein if a payment amount exceeds a threshold, then the user is prompted for security information;
wherein the payment computer verifies that the security information matches a previously transmitted account name and password;
if the verification fails, then the payment computer sends a document to the buyer computer indicating that access is not allowed.

161. The method of claim 158, wherein a settlement database is used to determine whether the user has unexpired access to a domain identified in the payment message;
wherein the user is presented with an option to repurchase or to use the unexpired access.

162. The method of claim 161, wherein the purchase of a product in a certain domain by a user account entitles access to other products in the domain for free or at a reduced price.

163. The method of claim 158, wherein the payment computer verifies whether the user account has sufficient funds or credit that satisfies a payment amount specified in the payment message,
if the verification fails, then the payment computer sends a document to the buyer computer indicating that the user has insufficient funds.

164. The method of claim 158, wherein the payment computer records an end of duration time in a settlement database.

165. The method of claim 158, wherein the payment computer creates an access URL including an access URL authenticator that is a digital signature generated based on a cryptographic key;

wherein the access URL authenticator is a hash of other information in the access URL;

wherein the payment computer sends a redirect to the access URL to the buyer computer;

wherein the buyer computer sends the access URL to a merchant computer.

166. The method of claim 165, wherein the merchant computer verifies whether the access URL authenticator was created from said other information in the access URL using the cryptographic key;

if the verification fails, then the merchant computer sends a document to the buyer computer indicating that access is not allowed.

167. The method of claim 165, wherein the merchant computer verifies whether a duration time for access has expired;

if the verification fails, then the merchant computer sends a document to the buyer computer indicating that the duration time has expired.

168. The method of claim 165, wherein the merchant computer verifies that a buyer computer network address is the same as a buyer network address contained in the access URL;

if the verification fails, then the merchant computer sends a document to the buyer computer indicating that access is not allowed.

* * * * *

(12) EX PARTE REEXAMINATION CERTIFICATE (9300th)
United States Patent
Payne et al.

(10) Number: US 5,715,314 C2
(45) Certificate Issued: Sep. 11, 2012

(54) NETWORK SALES SYSTEM

(75) Inventors: Andrew C. Payne, Lincoln, MA (US); Lawrence C. Stewart, Burlington, MA (US); G. Winfield Treese, Wayland, MA (US)

(73) Assignee: Soverain Software LLC, Chicago, IL (US)

Reexamination Request:
No. 90/007,287, Nov. 3, 2004
No. 90/011,443, Jan. 18, 2011

Reexamination Certificate for:
| | |
|---|---|
| Patent No.: | 5,715,314 |
| Issued: | Feb. 3, 1998 |
| Appl. No.: | 08/328,133 |
| Filed: | Oct. 24, 1994 |

Reexamination Certificate C1 5,715,314 issued Oct. 9, 2007

(51) Int. Cl.
*G06Q 10/00* (2006.01)
*G06Q 20/00* (2006.01)
*G07F 7/00* (2006.01)

(52) U.S. Cl. .................. 705/78; 705/26.35; 705/75; 713/162

(58) Field of Classification Search .............. 380/24
See application file for complete search history.

(56) References Cited

To view the complete listing of prior art documents cited during the proceedings for Reexamination Control Numbers 90/011,443 and 90/007,287, please refer to the USPTO's public Patent Application Information Retrieval (PAIR) system under the Display References tab.

*Primary Examiner* — Deandra M. Hughes

(57) ABSTRACT

A network-based sales system includes at least one buyer computer for operation by a user desiring to buy a product, at least one merchant computer, and at least one payment computer. The buyer computer, the merchant computer, and the payment computer are interconnected by a computer network. The buyer computer is programmed to receive a user request for purchasing a product, and to cause a payment message to be sent to the payment computer that comprises a product identifier identifying the product. The payment computer is programmed to receive the payment message, to cause an access message to be created that comprises the product identifier and an access message authenticator based on a cryptographic key, and to cause the access message to be sent to the merchant computer. The merchant computer is programmed to receive the access message, to verify the access message authenticator to ensure that the access message authenticator was created using the cryptographic key, and to cause the product to be sent to the user desiring to buy the product.

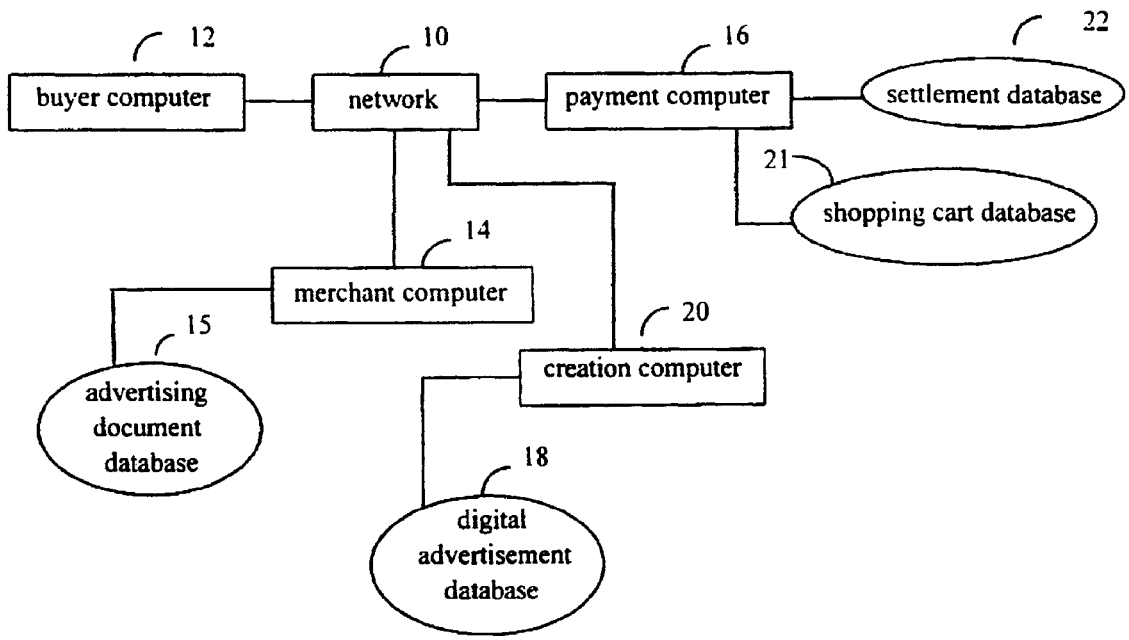

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 34, 35, 36, 39, 49, 50, 51, 84, 109, 110, 111, 134 and 144 is confirmed.

Claims 1-33, 37-38, 40-48, 52-83, 85-108, 112-133, 135-143, and 145-168 were not reexamined.

\* \* \* \* \*